US009806967B2

(12) United States Patent
Minamino et al.

(10) Patent No.: US 9,806,967 B2
(45) Date of Patent: Oct. 31, 2017

(54) COMMUNICATION DEVICE AND DATA PROCESSING METHOD

(71) Applicants: Sony Corporation, Tokyo (JP); Sony Interactive Entertainment America LLC, San Mateo, CA (US)

(72) Inventors: Takanori Minamino, Kanagawa (JP); Khoi Nguyen, Irvine, CA (US)

(73) Assignees: Sony Corporation (JP); Sony Interactive Entertainment America LLC, San Mateo, CA (US)

( * ) Notice: Subject to any disclaimer, the term of this patent is extended or adjusted under 35 U.S.C. 154(b) by 146 days.

(21) Appl. No.: 14/564,249

(22) Filed: Dec. 9, 2014

(65) Prior Publication Data
US 2015/0350037 A1 Dec. 3, 2015

Related U.S. Application Data

(60) Provisional application No. 62/005,277, filed on May 30, 2014.

(51) Int. Cl.
*G06F 15/173* (2006.01)
*H04L 12/26* (2006.01)
*H04L 29/06* (2006.01)

(52) U.S. Cl.
CPC .......... *H04L 43/024* (2013.01); *H04L 43/087* (2013.01); *H04L 65/4084* (2013.01);
(Continued)

(58) Field of Classification Search
CPC . H04L 43/024; H04L 43/087; H04L 65/4084; H04L 65/601; H04L 65/604; H04L 65/80
See application file for complete search history.

(56) References Cited

U.S. PATENT DOCUMENTS 5,819,048 A * 10/1998 Okazaki ............... H04N 17/004
348/412.1
6,504,838 B1 * 1/2003 Kwan ..................... G10L 25/90
370/352

(Continued)

OTHER PUBLICATIONS

International Search Report for PCT/JP2015/002465, dated Aug. 6, 2015.

*Primary Examiner* — Tonia L Dollinger
*Assistant Examiner* — Dixon Dabipi
(74) *Attorney, Agent, or Firm* — Lerner, David, Littenberg, Krumholz & Mentlik, LLP

(57) ABSTRACT

A packet reception state monitoring unit calculates a target stored data number as a target number of audio packets stored in a memory based on the variation in the reception intervals of audio packets, and a reproduction control unit controls the audio reproduction speed in accordance with the difference between the target stored data number and a memory-stored data number. When the memory-stored data number is smaller than the target stored data number, reproduction control is performed in a low-speed reproduction mode at a lower speed than a regular reproduction speed. When the memory-stored data number is larger than the target stored data number, reproduction control is performed in a high-speed reproduction mode at a higher speed than the regular reproduction speed. A reproduction speed changing process is performed, with hysteresis being given to transitions of the difference between the memory-stored data number and the target stored data number.

13 Claims, 11 Drawing Sheets

(52) U.S. Cl.
CPC .......... *H04L 65/601* (2013.01); *H04L 65/604* (2013.01); *H04L 65/80* (2013.01)

(56) References Cited

U.S. PATENT DOCUMENTS

| | | | | |
|---|---|---|---|---|
| 6,862,298 | B1* | 3/2005 | Smith | H04J 3/0632 370/235 |
| 8,238,341 | B2* | 8/2012 | Ho | H04L 1/1841 370/394 |
| 8,560,331 | B1* | 10/2013 | Pereira | H04N 21/431 704/503 |
| 2005/0094639 | A1* | 5/2005 | Miyazaki | H04M 11/066 370/389 |
| 2005/0243846 | A1* | 11/2005 | Mallila | G10L 19/005 370/412 |
| 2006/0013263 | A1* | 1/2006 | Fellman | H04J 3/0638 370/503 |
| 2011/0044357 | A1* | 2/2011 | Shtern | H04J 3/0664 370/516 |
| 2012/0176172 | A1* | 7/2012 | Webb, III | G06F 1/0321 327/164 |

* cited by examiner

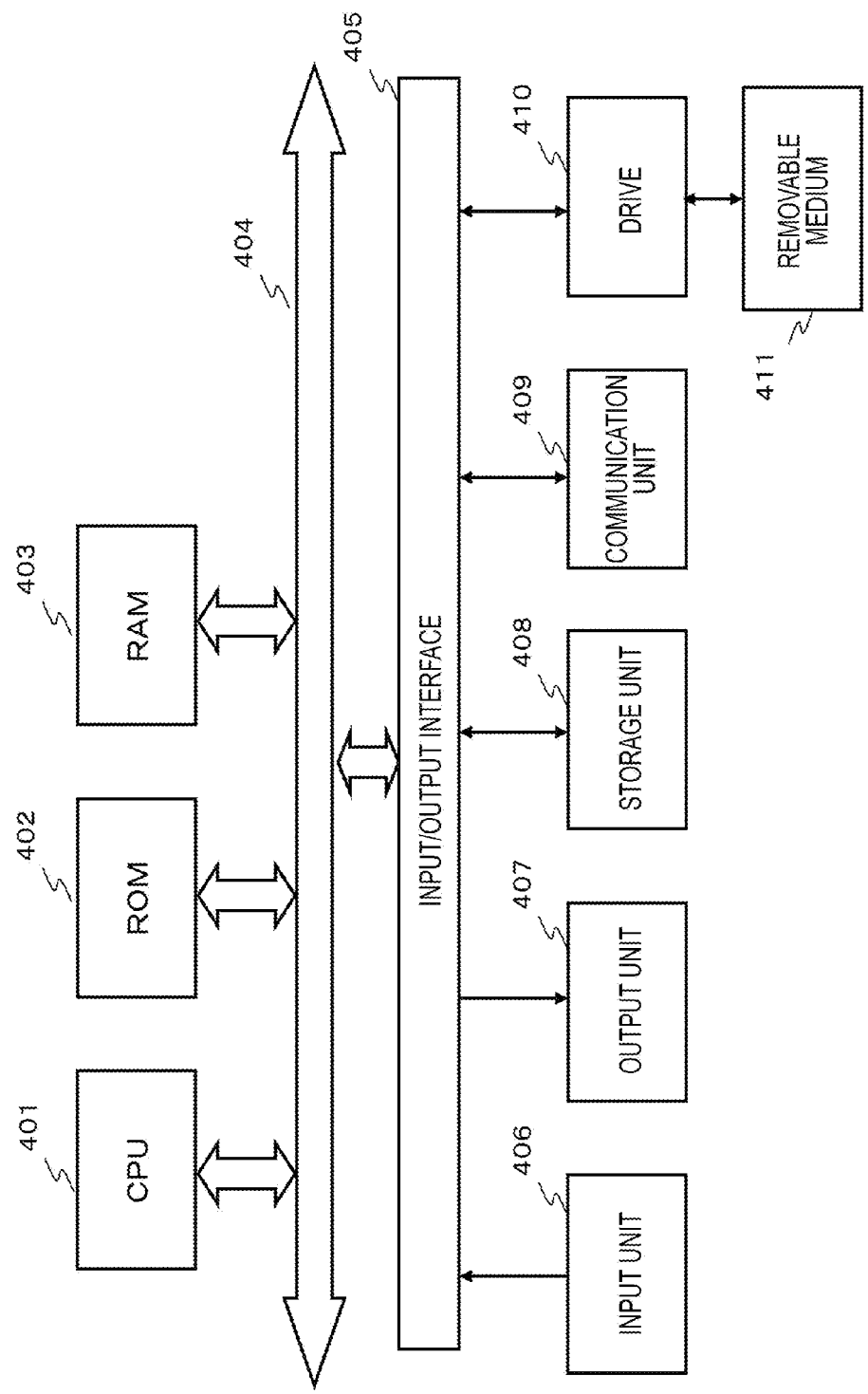

COMMUNICATION DEVICE AND DATA PROCESSING METHOD

CROSS REFERENCE TO RELATED APPLICATION

This application claims the benefit of priority of U.S. Provisional Application Ser. No. 62/005,277, filed on May 30, 2014, the entire contents of which is incorporated herein by reference.

TECHNICAL FIELD

The present disclosure relates to a communication device and a data processing method. More particularly, the present disclosure relates to a communication device and a data processing method for stably outputting data that is received via a network.

BACKGROUND ART

The use of so-called cloud computing systems is becoming popular these days. In a cloud computing system, a data process request is transmitted from a client such as a portable terminal to a server, data processing is performed at the server, the result of the data processing is returned to the client, and the client obtains the result of the data processing.

An example of the use of such a cloud system is a game played on a portable gaming machine. The portable gaming machine (a client) being operated by a user communicates with a server, and image data such as a game development image and audio data are provided to the client with the use of a highly-sophisticated data processing function of the server.

In such a cloud-type gaming system, user action information is transmitted from the client to the server. In accordance with the action information received from the client, the server develops the game, generates updated images and audio data, and transmits those images and data to the client. The client reproduces the updated images and sound received from the server. By conducting such a process, even a client that does not have a sophisticated processor or the like can obtain results of data processing performed with the use of a highly-sophisticated data processing function of the server.

However, in the data being transferred between the server and the client, delays or jitter (fluctuations) occurs due to a network condition. Normally, image and audio data is transmitted as encoded data, and it is necessary for the client to sequentially decode and output the received data.

When delays or jitter (fluctuations) occurs due to a network condition, the series of processes such as packet reception, decoding, and display on the client side are disturbed, and a discontinuous image or intermittent sound might be generated.

As a technique to solve problems such as intermittent sound due to delays of communication data or the like, a process of changing the audio reproduction speed in accordance with packet delays is disclosed in U.S. Pat. No. 8,560,331 B1.

SUMMARY

Technical Problem

In a case where a process of outputting data such as images and sound received via a network is performed as in the above described cloud-type system or the like, for example, stable data outputting might be hindered by a communication delay.

As for a structure to avoid unstable data outputting, the above mentioned Patent Literature, U.S. Pat. No. 8,560,331 B1, discloses a structure that monitors a delay of each packet and controls the reproduction speed in accordance with the delay state of each packet.

If the reproduction speed is changed in accordance with the delay state of each packet, however, the reproduction speed often varies, and might give viewers a feeling of strangeness.

Also, to change the reproduction speed in accordance with the delay state of each packet, reproduction speed control is performed frequently, and as a result, the load applied to the device becomes too large.

The present disclosure is made in view of those circumstances, and is to provide a communication device and a data processing method for realizing stable data outputting by performing smooth reproduction speed control, with no viewers having a feeling of strangeness and no excessive load being applied to the device.

Solution to Problem

A first aspect of the present disclosure is a communication device that includes: a packet reception state monitoring unit that monitors reception intervals of packets received by a communication unit, and generates and outputs a target value as a parameter for a reproduction control process based on the variation in the packet reception intervals; and a reproduction control unit that performs reproduction control in accordance with the target value generated by the packet reception state monitoring unit, wherein the reproduction control unit controls an audio reproduction speed or image frame reproduction in accordance with the target value.

A second aspect of the present disclosure is a data processing method that is implemented in a communication device, includes: a packet reception state monitoring unit monitoring reception intervals of packets received by a communication unit, and generating and outputting a target value as a parameter for a reproduction control process based on the variation in the packet reception intervals; and a reproduction control unit performing reproduction control in accordance with the target value generated by the packet reception state monitoring unit, wherein an audio reproduction speed or image frame reproduction is controlled in accordance with the target value in the reproduction control.

Other objects, features, and advantages of the present disclosure will become apparent in conjunction with the detailed description of embodiments of the present disclosure and the accompanying drawings. In this specification, a "system" means a logical assembly of devices, and the respective devices are not necessarily located in the same housing.

Advantageous Effects of Invention

With the structure of an embodiment of the present disclosure, a device and a method for monitoring the variation in packet reception intervals and performing optimum reproduction control in accordance with the variation are realized.

Specifically, a packet reception state monitoring unit calculates a target stored data number as a target number of audio packets stored in a memory based on the variation in the reception intervals of audio packets, and a reproduction control unit controls the audio reproduction speed in accordance with the difference between the target stored data number and a memory-stored data number. When the memory-stored data number is smaller than the target stored data number, reproduction control is performed in a low-speed reproduction mode at a lower speed than a regular reproduction speed. When the memory-stored data number is larger than the target stored data number, reproduction control is performed in a high-speed reproduction mode at a higher speed than the regular reproduction speed. A reproduction speed changing process is performed, with hysteresis being given to transitions of the difference between the memory-stored data number and the target stored data number.

With this structure, a device and a method for monitoring the variation in packet reception intervals and performing optimum reproduction control in accordance with the variation is realized.

It should be noted that the effects described in this specification are merely example and do not limit the disclosure, and additional effects may be achieved.

BRIEF DESCRIPTION OF DRAWINGS

FIG. 11 is a diagram for explaining an example hardware configuration of a communication device as a client.

DESCRIPTION OF EMBODIMENTS

Figure 1:
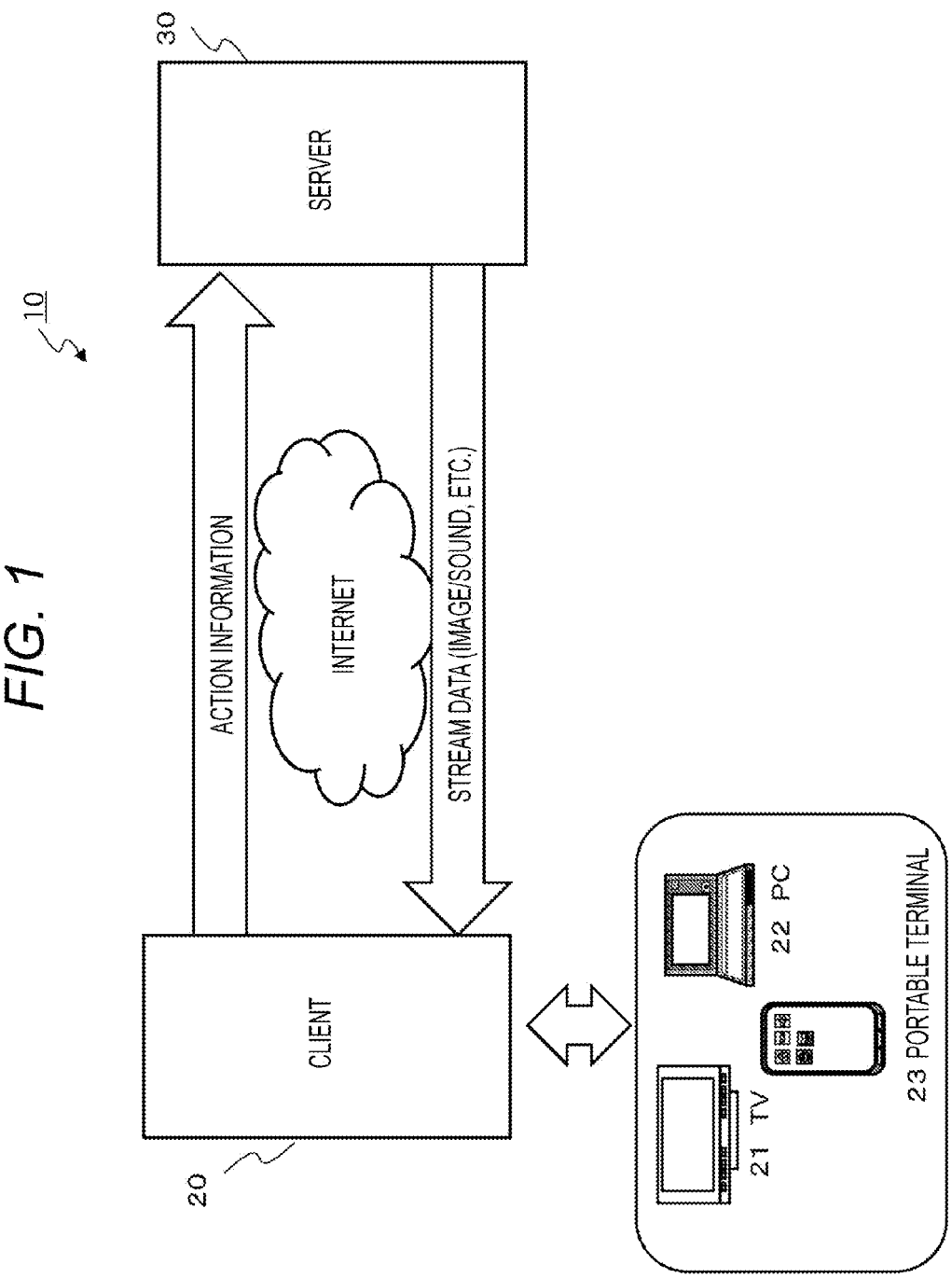
FIG. 1 is a diagram for explaining an example structure of a communication system that performs processes of the present disclosure.

The following is a detailed description of a communication device and a data processing method of the present disclosure, with reference to the accompanying drawings. Explanation will be made in the following order.
1. Example structure of a communication system
2. Example structure of a client device
3. Details of a reproduction speed control process to be performed by the audio data processing unit
4. Specific example of the audio reproduction speed control process
5. Sequence of the reproduction speed control process to be performed by the audio data processing unit
6. Example of an image data reproduction control process to be performed by the image data processing unit
7. Sequence of the reproduction control process to be performed by the image data processing unit
8. Example hardware configuration of the client
9. Summary of the structures of the present disclosure 1. Example Structure of a Communication System Referring first to FIG. 1, an example structure of a communication system having a client that performs a process of the present disclosure is described.

As shown in FIG. 1, a communication system 10 includes a client 20 and a server 30 that can perform bidirectional communications. The client 20 and the server 30 perform communications via a network such as the Internet.

The client 20 is a user terminal device for a general user, and more specifically, is a television receiver 21, a PC 22, or a portable terminal 23 such as a game machine or a smartphone, for example.

The client 20 transmits user action information about the client 20 to the server 30. The server 30 performs data processing in accordance with the action information received from the client 20. In a case where the user is playing a game at the client 20, for example, the game is developed in accordance with user actions, and stream data generated by encoding updated image and audio data is transmitted to the client 20.

The client 20 decodes the stream data received from the server 30, and outputs an image and sound as a decode result via a display and a speaker.

2. Example Structure of the Client Device

Figure 2:
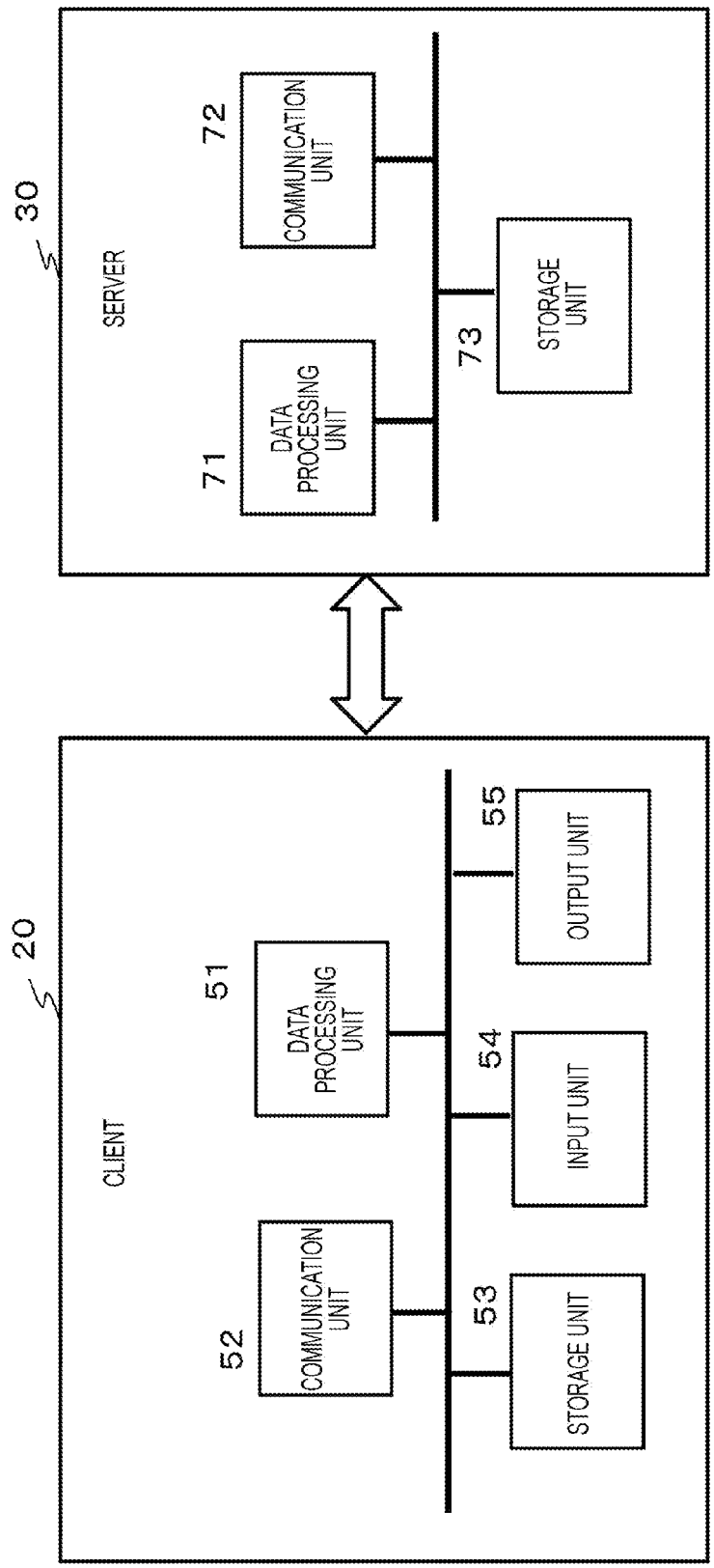
FIG. 2 is a diagram for explaining example structures of a server and a client.

Referring now to FIG. 2, an example structure of the client 20 as a communication device that performs a communication process with the server 30 is described.

As shown in FIG. 2, the client 20 includes a data processing unit 51, a communication unit 52, a storage unit 53, an input unit 54, and an output unit 55.

The communication unit 52 receives data distributed from the server 30, such as a packet storing images, sound, and the like.

The data processing unit 51 acquires image data and audio data from the received packet, and performs a decoding process and the like, to generate and output reproduction data.

User instructions and the like are input via the input unit 54.

The reproduction data is output to the output unit 55 including a display unit, a speaker, and the like.

The storage unit 53 stores the received data including images, sound, and a subtitle.

The storage unit 53 is also used as the work area for the data processing to be performed by the data processing unit 51, and is further used as the storage area for various kinds of parameters.

The server 30 includes a data processing unit 71, a communication unit 72, and a storage unit 73.

The data processing unit 71 of the server 30 performs various kinds of data processing to conduct a data distribution service. For example, the configuration data of the data distribution service is generated, and transmission thereof is controlled.

Specifically, a packet containing image and audio data is generated and distributed. Further, various kinds of notification information are generated and distributed.

The communication unit 72 transmits image, audio, and other data generated by the data processing unit 71.

The storage unit 73 stores the data of images, sound, and the like to be distributed.

The storage unit 73 is also used as the work area for the data processing to be performed by the data processing unit 71, and is further used as the storage area for various kinds of parameters.

Figure 3:
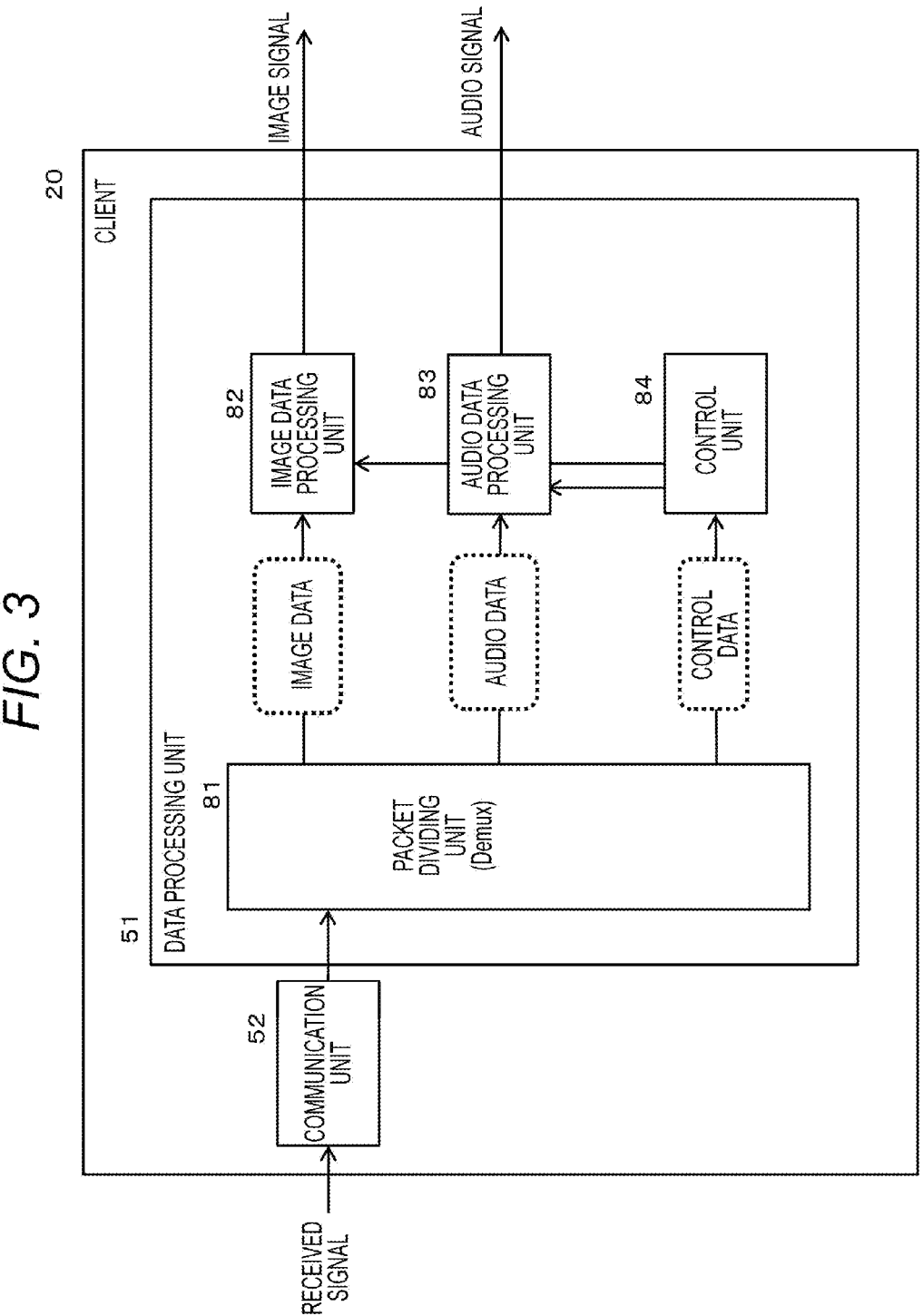
FIG. 3 is a diagram for explaining an example structure of the data processing unit of the client.

FIG. 3 is a diagram showing the structure of the data processing unit 51 of the client 20 in detail.

The data processing unit 51 of the client 20 includes a packet dividing unit 81, an image data processing unit 82, an audio data processing unit 83, and a control unit 84.

The packet dividing unit 81 divides a received packet into respective types of data (images, sound, and other control signals) based on header information about the packet received via the communication unit 52, and supplies the respective divided packets to the respective data processing units.

The image data processing unit 82 acquires image data from a packet containing image data, and performs processes necessary for reproduction images, such as a decoding process.

The audio data processing unit 83 acquires audio data from a packet containing audio data, and performs processes necessary for reproduction of sound, such as a decoding process.

The control unit 84 controls the processes to be performed at the image data processing unit 82 and the audio data processing unit 83.

3. Details of the Reproduction Speed Control Process to be Performed by the Audio Data Processing Unit Next, the reproduction speed control process to be performed on audio data by the audio data processing unit 83 of the client 20 is described in detail.

Figure 4:
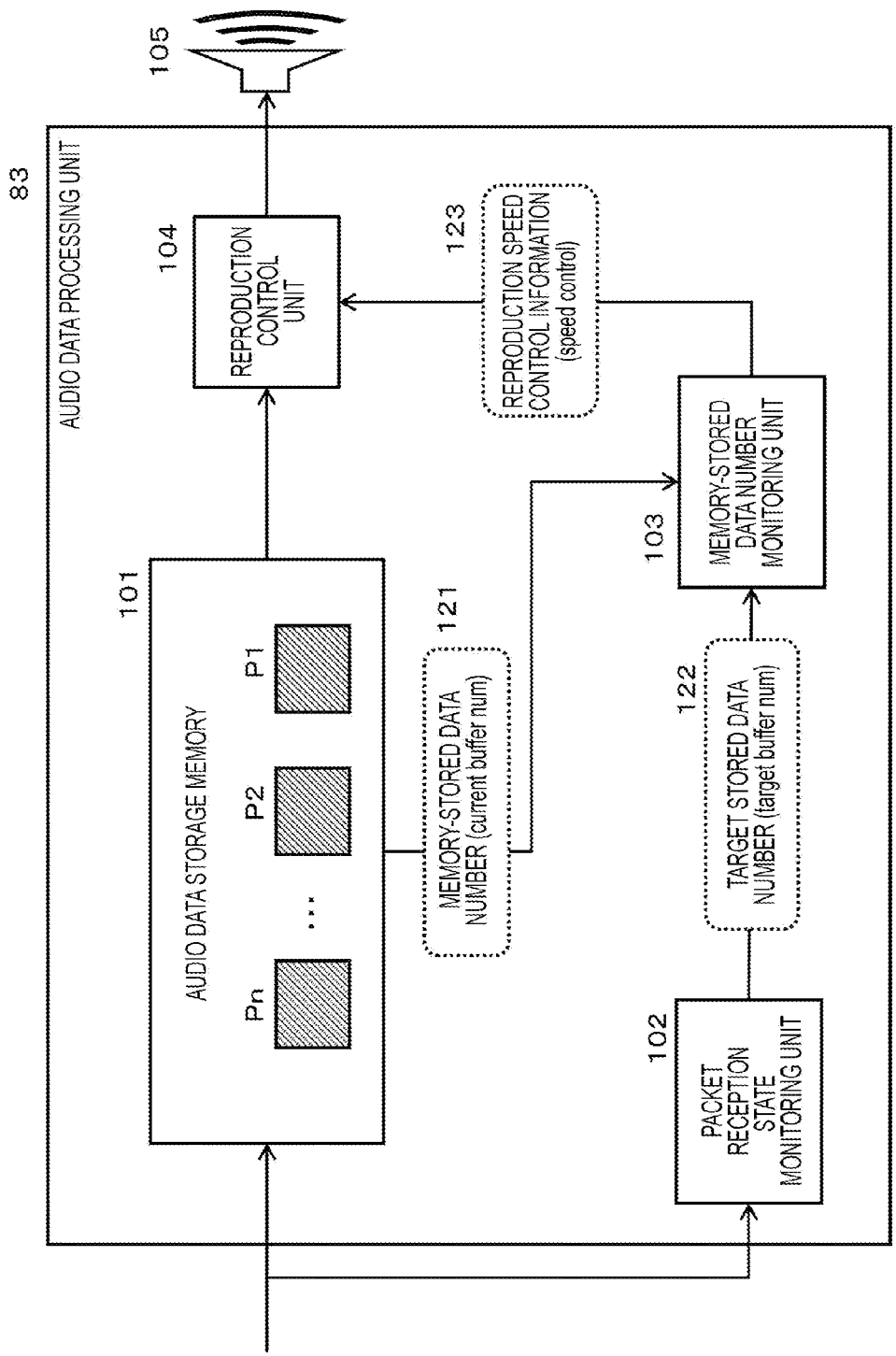
FIG. 4 is a diagram for explaining an example structure of the audio data processing unit of the client.

FIG. 4 is a diagram showing a specific example structure of the audio data processing unit 83 of the client 20.

The audio data processing unit 83 includes an audio data storage memory 101, a packet reception state monitoring unit 102, a memory-stored data number monitoring unit 103, and a reproduction control unit 104.

The audio data storage memory 101 is a memory that stores packets received from the server 30, and sequentially stores audio packets containing audio data selected by the packet dividing unit 81.

P1, P2, . . . , Pn shown in the drawing represent the audio packets.

Each of these packets stores reproduction audio data of a predetermined length (several msec, for example).

The packet reception state monitoring unit 102 detects reception intervals of audio packets received from the server 30.

The server 30 transmits audio packets at predetermined intervals. However, the reception intervals of audio packets received by the client 20 are not uniform due to a congestion state of the network or the like, and fluctuations or so-called jitter occurs.

The packet reception state monitoring unit 102 detects the reception intervals of respective packets containing audio data. In accordance with the detected packet reception intervals, the packet reception state monitoring unit 102 calculates a target stored data number (target buffer number) 122 in the audio data storage memory 101, and outputs the target stored data number (target buffer number) 122 to the memory-stored data number monitoring unit 103.

For example, if audio packets are received at regular intervals, and sound reproduction is performed at constant speed, the number of packets stored in the audio data storage memory 101 is substantially maintained constant.

However, if the network is congested, and packet reception is delayed, packet inputs to the memory 101 do not keep up with packet consumption accompanying a reproduction process, and the number of packets stored in the audio data storage memory 101 decreases. If the delay is long, the memory 101 eventually runs out of packets to be reproduced, and reproduced sound might become intermittent.

So as to prevent such a situation, the audio data processing unit 83 of the client 20 of the present disclosure changes the audio reproduction speed in accordance with packet reception states.

The packet reception state monitoring unit 102 calculates the target stored data number (target buffer number) 122 as the data to be used in controlling the audio reproduction speed, and outputs the target stored data number 122 to the memory-stored data number monitoring unit 103.

The packet reception state monitoring unit 102 detects the reception intervals of packets containing audio data received by the communication unit 52. In accordance with the detected packet reception intervals, the packet reception state monitoring unit 102 calculates the target stored data number (target buffer number) 122 in the audio data storage memory 101, and outputs the target stored data number 122 to the memory-stored data number monitoring unit 103.

The memory-stored data number monitoring unit 103 acquires the memory-stored data number (current buffer number) 121 calculated based on the number of data packets stored in the audio data storage memory 101, and further receives the target stored data number (target buffer number) 122 from the packet reception state monitoring unit 102.

The memory-stored data number monitoring unit 103 generates reproduction speed control information (speed control) 123 based on the following two pieces of data: (a) the memory-stored data number (current buffer number) 121 and (b) the target stored data number (target buffer number) 122. The memory-stored data number monitoring unit 103 then outputs the reproduction speed control information (speed control) 123 to the reproduction control unit 104.

The reproduction control unit 104 sequentially acquires audio packets from the audio data storage memory 101, and performs processes necessary for reproduction, such as decoding. The results are output to the output unit 105 such as a speaker.

In this audio reproduction process, the reproduction control unit 104 performs a reproduction process while controlling the reproduction speed based on the reproduction speed control information (speed control) 123 that is input from the memory-stored data number monitoring unit 103.

The audio data processing unit 83 of the client 20 of the present disclosure calculates a target number of packets to be stored in the audio data storage memory 101, and changes the reproduction speed in accordance with a difference between the number of packets actually stored in the memory and the target number.

Figure 5:
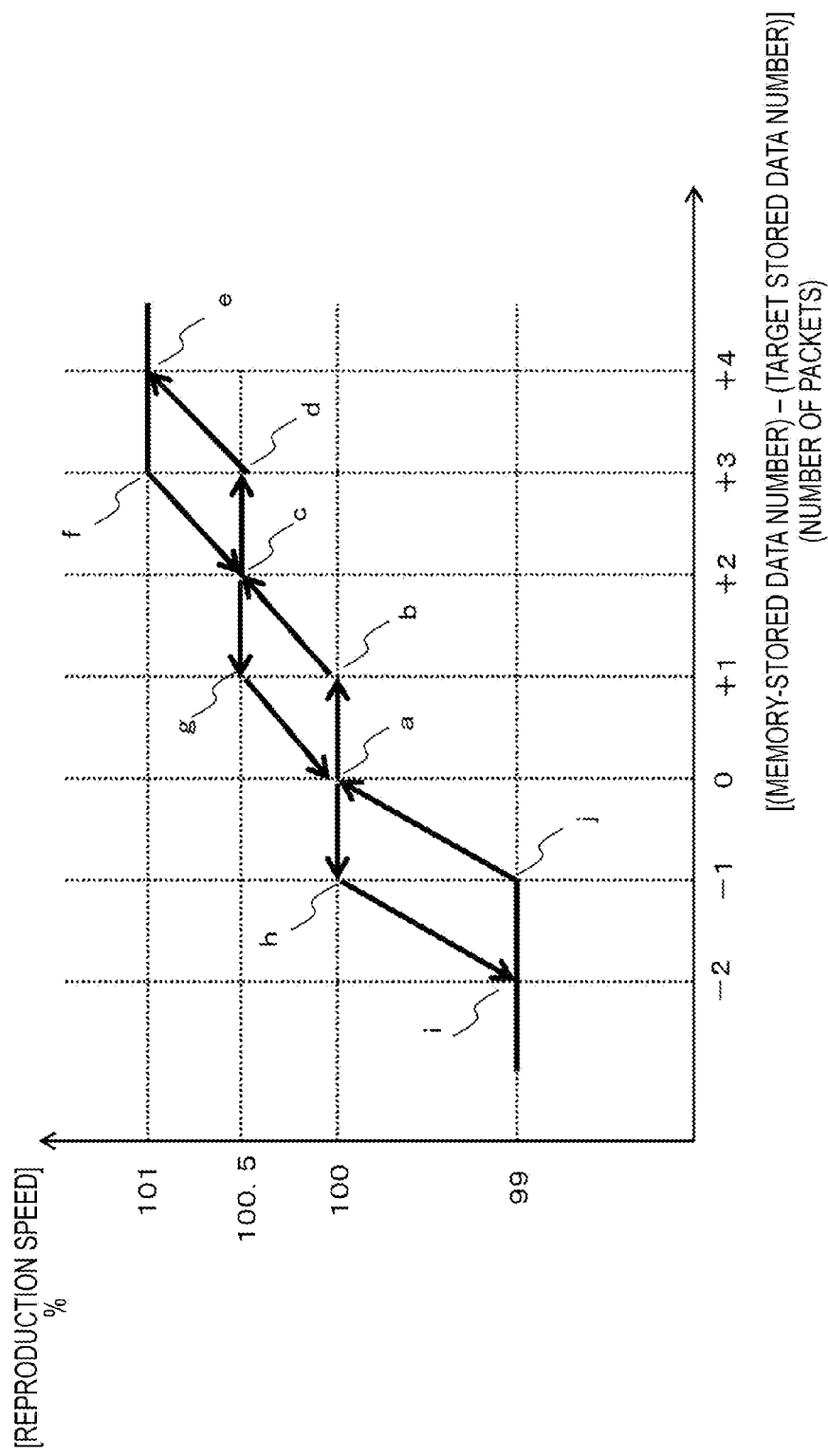
FIG. 5 is a diagram for explaining an example of an audio data reproduction control process to be performed by the client.

Referring now to FIG. 5, this reproduction speed control process is described in detail.

In the graph shown in FIG. 5, the abscissa axis indicates [(memory-stored data number)−(target stored data number)] (number of packets), and the ordinate axis indicates reproduction speed (%). The graph shows the correspondence relationship between the number of packets and the reproduction speed.

At the position of 0 on the abscissa axis, [(memory-stored data number)−(target stored data number)] is 0, and the number of the audio data packets stored in the memory 101 is equal to the target number.

At the position of +1, the memory-stored data number is larger than the target number by 1.

At the position of −1, the memory-stored data number is smaller than the target number by 1.

The reproduction speed at the position where [(memory-stored data number)−(target stored data number)] (number of packets) is 0 on the abscissa axis is 100%.

The reproduction speed of 100% is specified as the regular reproduction speed.

When [(memory-stored data number)−(target stored data number)] on the abscissa axis has a positive value, such as +1, +2, or +3, control is conducted so that reproduction is performed at a higher reproduction speed than the regular reproduction speed.

That is, when the memory-stored data number is larger than the target stored data number, reproduction control is conducted in a high-speed reproduction mode to increase the reproduction speed and speed up packet consumption in the memory.

In the graph shown in FIG. 5, the reproduction speed in the high-speed reproduction mode is increased to 100.5% and then to 101%, with the regular speed being 100%.

When [(memory-stored data number)−(target stored data number)] on the abscissa axis has a negative value, such as −1 or −2, control is conducted so that reproduction is performed at a lower reproduction speed than the regular reproduction speed.

That is, when the memory-stored data number is smaller than the target stored data number, reproduction control is conducted in a low-speed reproduction mode to lower the reproduction speed and slow down packet consumption in the memory.

In the graph shown in FIG. 5, the reproduction speed in the low-speed reproduction mode is controlled to decrease to 99%, with the regular speed being 100%.

As can be seen from the graph in FIG. 5, the process of changing the reproduction speed is to be performed slowly, with hysteresis being given to transitions of [(memory-stored data number)−(target stored data number)].

For example, in a case where a transition from position a where [(memory-stored data number)−(target stored data number)] is 0 to position b where [(memory-stored data number)−(target stored data number)] is +1 occurs in FIG. 5, the reproduction speed at position b is maintained at 100%, which is the reproduction speed at position a.

When the memory-stored data number increases further, and a transition from position b to position c where [(memory-stored data number)−(target stored data number) is +2 occurs, the reproduction speed is increased by 0.5%, and is set at a reproduction speed of 100.5% at position c.

As described above, when successive increases in [(memory-stored data number)−(target stored data number)] are confirmed, the reproduction speed is increased by a predetermined amount (0.5% in this example).

The memory-stored data number increases further, and a transition from position c to position d where [(memory-stored data number)−(target stored data number)] is +3 occurs.

At this transition position d, however, the reproduction speed is maintained at 100.5%, which is the same as the reproduction speed at position c.

When the memory-stored data number increases further, and a transition from position d to position e where [(memory-stored data number)−(target stored data number) is +4 occurs, the reproduction speed is further increased by 0.5%, and is set at a reproduction speed of 101% at position e.

As described above, the process of changing the reproduction speed is controlled slowly, with predetermined hysteresis being given to transitions of [(memory-stored data number)−(target stored data number)].

In the example shown in the drawing, the reproduction speed is increased when the value of change in [(memory-stored data number)−(target stored data number)] is +2.

The amount of change in the reproduction speed is 0.5% at a time. Specifically, the reproduction speed is changed to 100.5% and then to 101%, with the regular reproduction speed being 100%.

The upper limit value the reproduction speed is 101%. This is because a higher reproduction speed than that might cause viewers to have a feeling of strangeness.

The same applies to a case where the memory-stored data number decreases from position e shown in FIG. 5, and changes further from position f to position c to position g to position a. Every time −2 is detected as the amount of change in the difference between the memory-stored data number and the target number, the reproduction speed is decreased stepwise from 101% to 100.5% to 100%.

When [(memory-stored data number)−(target stored data number)] on the abscissa axis has a negative value such as −1 or −2, or when the memory-stored data number is smaller than the target stored data number, reproduction control is conducted in the low-speed reproduction mode to lower the reproduction speed and slow down packet consumption in the memory.

In the graph shown in FIG. 5, the reproduction speed in the low-speed reproduction mode is controlled to decrease to 99%, with the regular speed being 100%.

For example, in a case where a transition from position a where [(memory-stored data number)−(target stored data number)] is 0 to position h where [(memory-stored data number)−(target stored data number)] is −1 occurs, the reproduction speed at position h is maintained at 100%, which is the reproduction speed at position a.

When the memory-stored data number decreases further, and a transition from position h to position i where [(memory-stored data number)−(target stored data number) is −2 occurs, the reproduction speed is lowered by 1%, and is set at a reproduction speed of 99% at position i.

When [(memory-stored data number)−(target stored data number)] changes in the positive direction, the reproduction speed is increased by +0.5% in accordance with an amount of change of +2. When [(memory-stored data number)−(target stored data number)] changes in the negative direction, on the other hand, the reproduction speed is lowered by −1.0% in accordance with an amount of change of −2.

This is because, when [(memory-stored data number)−(target stored data number)] changes in the negative direction, there is a possibility of intermittent sound due to a packets shortage, and packet consumption is preferably minimized.

In the low-speed reproduction mode, the lower limit value of the reproduction speed is set at 99%, with the regular reproduction speed being 100%. This is because a lower reproduction speed than that might cause viewers to have a feeling of strangeness.

It should be noted that the reproduction speed control and the hysteresis settings illustrated in FIG. 5 are merely examples, and various other settings are possible.

For example, optimum settings may be preferably set in accordance with the reproduction length of the audio data contained in one packet.

4. Specific Example of the Audio Reproduction Speed Control Process

Next, a specific example of a process of calculating parameters to be used in performing the audio reproduction speed control process described above with reference to FIGS. 4 and 5 is described.

As can be seen from the above description, the audio data processing unit 83 of the client 20 of the present disclosure sets a target number of packets to be stored in the audio data storage memory 101, and changes the reproduction speed in accordance with a difference between the number of packets actually stored in the memory and the target number.

One of the parameters necessary in the reproduction speed control is [(memory-stored data number)−(target stored data number)], which is indicated by the abscissa axis of the graph shown in FIG. 5.

As shown in FIG. 4, the memory-stored data number is the memory-stored data number (current buffer number) 121 calculated based on the data stored in the audio data storage memory 101.

Also, as shown in FIG. 4, the target stored data number is the target stored data number (target buffer number) 122 calculated by the packet reception state monitoring unit 102 in accordance with packet reception intervals.

The memory-stored data number monitoring unit 103 generates the reproduction speed control information (speed control) 123 based on the two pieces of data, which are (a) the memory-stored data number (current buffer number) 121 and (b) the target stored data number (target buffer number) 122. The memory-stored data number monitoring unit 103 then outputs the reproduction speed control information (speed control) 123 to the reproduction control unit 104.

The reproduction control unit 104 sequentially acquires audio packets from the audio data storage memory 101, and performs processes necessary for reproduction, such as decoding. The results are output to the output unit 105 such as a speaker.

In this audio reproduction process, the reproduction control unit 104 performs a reproduction process while controlling the reproduction speed based on the reproduction speed control information (speed control) 123 that is input from the memory-stored data number monitoring unit 103.

This series of processes are performed on a regular basis.

The parameters to be used in this series of processes are the following three parameters: (a) the memory-stored data number (current buffer number) 121, (b) the target stored data number (target buffer number) 122, and (c) the reproduction speed control information (speed control) 123.

The timings to update those three parameters (a) through (c) may be the same timings or may be different timings.

As an example, a process of updating (a) the memory-stored data number (current buffer number) 121 every two seconds, (b) the target stored data number (target buffer number) 122 every ten seconds, and (c) the reproduction speed control information (speed control) 123 every two seconds is described below.

First, an example of a process of calculating (a) the memory-stored data number (current buffer number) 121 is described.

The memory-stored data number monitoring unit 103 checks on the audio data storage memory 101 every time a new packet is input to the memory, and acquires the number of the packets stored in the memory.

In a case where a packet containing audio data is input approximately every 10 msec, for example, 200 checks are performed in two seconds.

The memory-stored data number monitoring unit 103 calculates the (a) memory-stored data number (current buffer number) 121 based on the average value (average_buffer_number) of approximately 200 pieces of data obtained through the approximately 200 memory checks performed in the two seconds.

Specifically, the memory-stored data number (current buffer number) 121 is calculated according to the following mathematical formula (1).

$$\text{Memory-stored data number(current buffer number)} = \text{average\_buffer\_number} = (\text{total number of pieces of memory-stored data at time of } n\text{th memory check})/n \quad (1)$$

In the above formula (1), n represents the number of times the memory 101 is checked on at intervals equivalent to the output intervals of the reproduction speed control signal (speed control) 123 that is output from the memory-stored data number monitoring unit 103.

In this example, the reproduction speed control signal (speed control) 123 is output from the memory-stored data number monitoring unit 103 every two seconds, and accordingly, n is equivalent to the number of times a check is performed in two seconds. In a case where a check is performed every time a packet is input every 10 msec, n is 200.

Next, an example of a process of calculating (b) the target stored data number (target buffer number) 122 is described.

The packet reception state monitoring unit 102 detects the reception intervals of packets containing audio data received by the communication unit 52. In accordance with the detected packet reception intervals, the packet reception state monitoring unit 102 calculates the target stored data number (target buffer number) 122 in the audio data storage memory 101, and outputs the target stored data number 122 to the memory-stored data number monitoring unit 103.

The packet reception state monitoring unit 102 updates the target stored data number (target buffer number) 122 at predetermined intervals, and outputs the target stored data number 122 to the memory-stored data number monitoring unit 103.

Here, an example case where the target stored data number (target buffer number) 122 is updated every ten seconds and is output to the memory-stored data number monitoring unit 103 is described.

The packet reception state monitoring unit 102 calculates the statistic variation in the input intervals of audio data packets input to the audio data processing unit 83, generates the target stored data number (target buffer number) 122 based on the calculated value of the variation, and outputs the target stored data number (target buffer number) 122 to the reproduction control unit 104.

An example where "standard deviation" is used as one of the index values of the static variation in the input intervals of audio data packets input to the audio data processing unit 83 is described below.

Specifically, the standard deviation of the input intervals of audio data packets is used as the index value indicating the variation in the packet input intervals.

As the variation in the packet input intervals becomes wider, the standard deviation of the packet input intervals becomes larger. As the variation in the packet input intervals becomes narrower, the standard deviation of the packet input intervals becomes smaller.

The packet reception state monitoring unit 102 first calculates the variance of the input intervals of audio data packets input to the audio data processing unit 83, and calculates the standard deviation (stdDev=√(variance)) based on the calculated variance.

The packet reception state monitoring unit 102 performs the calculation described below every time an audio data packet is input to the audio data processing unit 83, to update the variance of the input intervals of audio data packets input to the audio data processing unit 83.

In the ten seconds as the period of setting the timing to update the target stored data number (target buffer number) 122, a packet input interval is detected every time a packet is input, and the variance updating is continued based on the detected value.

Specifically, the packet input intervals of the packets that are input in the ten seconds are successively detected, and the variance of the packet input intervals is calculated.

The standard deviation (stdDev=√(variance)) of the packet input terminals is then calculated based on the calculated variance value.

Further, the target stored data number (target buffer number) 122 is calculated by using the calculated standard deviation (stdDev=√(variance)).

The variance calculation process to be performed by the packet reception state monitoring unit 102 is now described.

First, as an initial value setting process, the following parameters are set at 0.

n=0 mean=0

M2=0

In the above equations, n represents the number of times the variance value is updated (=the number of audio packet inputs), "mean" represents the mean value of the already measured packet intervals, and M2 represents the parameter applied to the variance calculation.

The following parameter updating is performed every time a packet is input.

$n=n+1$ $delta=x-mean$ $mean=mean+delta/n$ $M2=M2+delta\times(x-mean)$ $Variance=M2/(n-1)$ In the above equations, x represents the packet interval between a newly input audio packet and the previously input audio packet, and "mean" represents the mean value of already measured packet intervals.

The packet reception state monitoring unit 102 performs the above described parameter updating process every time an audio data packet is input to the audio data processing unit 83, and continues the parameter updating process for ten seconds, which is the period of setting the timing to update the target stored data number (target buffer number) 122.

As the above described parameter updating is continued for ten seconds, the variance of the packet reception intervals of the packets received in the ten seconds is calculated.

After calculating the variance of the packet reception intervals of the packets received in the ten seconds from the start of the variance updating process, the packet reception state monitoring unit 102 calculates the standard deviation (stdDev) of the packet reception intervals according to the mathematical formula (2) shown below based on the calculated variance.

Standard deviation(stdDev)=sqrt(variance)  (2)

In the above formula (2), sqrt represents a √ calculation (a square-root calculation).

Further, the packet reception state monitoring unit 102 calculates the target stored data number (target buffer number) 122 according to the mathematical formula (3) shown below by using the standard deviation (stdDev) of the packet reception intervals calculated according to the above mathematical formula (2) in the ten seconds.

Target stored data number=3+floor(stdDev)  (3)

In the above mathematical formula (3), "floor(stdDev)" represents the floor function for truncating the standard deviation (stdDev) to an integer.

The target stored data number (target buffer number) 122 calculated according to the above mathematical formula (3) may have any value, but an allowable minimum value and an allowable maximum value may be determined in advance.

For example, a minimum value (min) of 4 and a maximum value (max) of 8 may be set as an allowable range so that the target stored data number is set at 4 when the value calculated according to the above mathematical formula (3) is 3 or smaller, and the target stored data number is set at 8 when the value calculated according to the above mathematical formula (3) is 9 or greater.

This allowable range is merely an example, and an optimum range is preferably set in accordance with the largest possible number of pieces of data to be stored in the memory and the amount of data contained in each packet.

The packet reception state monitoring unit 102 calculates the target stored data number (target buffer number) 122 according to the above mathematical formula (3) on a regular basis, such as every ten seconds, and outputs the target stored data number (target buffer number) 122 to the memory-stored data number monitoring unit 103.

To sum up those processes, the memory-stored data number monitoring unit 103 performs the following processes.

(Process 1) Detecting the memory-stored data number (current buffer number) 121 every two seconds.

(Process 2) Receiving updated data of the target stored data number (target buffer number) 122 from the packet reception state monitoring unit 102 every ten seconds.

(Process 3) Calculating [(memory-stored data number)−(target stored data number)] every two seconds, which is the update interval of the memory-stored data number (current buffer number) 121.

This calculated value corresponds to the abscissa axis of the graph shown in FIG. 5.

(Process 4) Generating the reproduction speed control information (speed control) 123 based on the value of [(memory-stored data number)−(target stored data number)] calculated every two second, and outputting the reproduction speed control information (speed control) 123 to the reproduction control unit 104.

The processes to be performed by the memory-stored data number monitoring unit 103 are the above processes.

In (process 4), the reproduction speed control information (speed control) 123 to be generated based on [(memory-stored data number)–(target stored data number)] is set as follows.

In a case where [(memory-stored data number)–(target stored data number)] is 0, or where the memory-stored data number is equal to the target stored data number, the reproduction speed control information (speed control) 123 is generated so as to maintain the current reproduction speed, and is output to the reproduction control unit 104.

This process corresponds to point a in the graph shown in FIG. 5.

In a case where [(memory-stored data number)–(target stored data number)] is greater than 0, or where the memory-stored data number is larger than the target stored data number, reproduction control is performed in the high-speed reproduction mode. However, the reproduction speed changing process is performed, with hysteresis being given to transitions of the difference between the target number and the number of actually stored packets.

This process corresponds to points a through g in the graph shown in FIG. 5.

The reproduction control in the high-speed reproduction mode is performed in a case where [(memory-stored data number)–(target stored data number)] is greater than 0.

As described above with reference to FIG. 5, the reproduction speed changing process is performed, with hysteresis being given to transitions of the difference between the target stored data number and the memory-stored data number.

For example, in the specific example described with reference to FIG. 5, the reproduction speed is increased when two successive increases in [(memory-stored data number)–(target stored data number)] are detected. The reproduction speed is lowered when two successive decreases in [(memory-stored data number)–(target stored data number)] are detected.

However, an upper limit value of the reproduction speed is set, so that reproduction at a higher speed than the upper speed value is not performed. In the example illustrated in FIG. 5, the upper limit value of the reproduction speed is 101% of the regular reproduction speed.

In a case where [(memory-stored data number)–(target stored data number)] is smaller than 0, or where the memory-stored data number is smaller than the target stored data number, reproduction control is performed in the low-speed reproduction mode. However, the reproduction speed is changed, with hysteresis being given to transitions of the difference between the target number and the number of actually stored packets. This process corresponds to point a and points h through j in the graph shown in FIG. 5.

The reproduction control in the low-speed reproduction mode is performed in a case where [(memory-stored data number)–(target stored data number)] is smaller than 0.

As described above with reference to FIG. 5, the reproduction speed is changed, with hysteresis being given to transitions of the difference between the target stored data number and the memory-stored data number.

For example, in the specific example described with reference to FIG. 5, the reproduction speed is lowered when two successive decreases in [(memory-stored data number)–(target stored data number)] are detected. The reproduction speed is increased when two successive increases in [(memory-stored data number)–(target stored data number)] are detected.

However, a lower limit value of the reproduction speed is set, so that reproduction at a lower speed than the lower speed value is not performed. In the example illustrated in FIG. 5, the lower limit value of the reproduction speed is 99% of the regular reproduction speed.

As described above, the memory-stored data number monitoring unit 103 in the above described (process 4) generates the reproduction speed control information (speed control) 123 based on [(memory-stored data number)–(target stored data number)], and outputs the reproduction speed control information (speed control) 123 to the reproduction control unit 104.

Since the memory-stored data number is updated every two seconds, [(memory-stored data number)–(target stored data number)] is also updated every two seconds in the above described example.

The memory-stored data number monitoring unit 103 in the above described (process 4) generates the reproduction speed control information (speed control) 123 every two seconds based on [(memory-stored data number)–(target stored data number)], which is updated every two seconds, and outputs the reproduction speed control information (speed control) 123 to the reproduction control unit 104.

As described above with reference to FIG. 5, the reproduction speed changing process is performed, with hysteresis being given to transitions of [(memory-stored data number)–(target stored data number)].

In the example illustrated in FIG. 5, the reproduction speed control information (speed control) 123 to be output to the reproduction control unit 104 serves as the control information for performing reproduction at one of the following four reproduction speeds.

(1) Regular reproduction speed=100% (points a, b, and h in FIG. 5)
(2) High-speed reproduction=100.5% (points c, d, and g in FIG. 5)
(3) Highest-speed reproduction=101% (points e and f in FIG. 5)
(4) Low-speed reproduction=99% (points i and j in FIG. 5)

In the above described (process 4), the memory-stored data number monitoring unit 103 determines at which one of points a through i in the transition diagram shown in FIG. 5 [(memory-stored data number)–(target stored data number)] being updated every two seconds is located.

The memory-stored data number monitoring unit 103 acquires the reproduction speed (one of the above (1) through (4)) corresponding to the determined location, generates the reproduction speed control information (speed control) 123 for performing reproduction at the acquired reproduction speed, and outputs the reproduction speed control information (speed control) 123 to the reproduction control unit 104.

5. Sequence of the Reproduction Speed Control Process to be Performed by the Audio Data Processing Unit Referring now to the flowchart shown in FIG. 6, the reproduction speed control sequence to be performed by the audio data processing unit 83 is described. The flow shown in FIG. 6 is realized by performing a process in accordance with a program stored in the storage unit under the control of the control unit of the client 20, for example.

Figure 6:
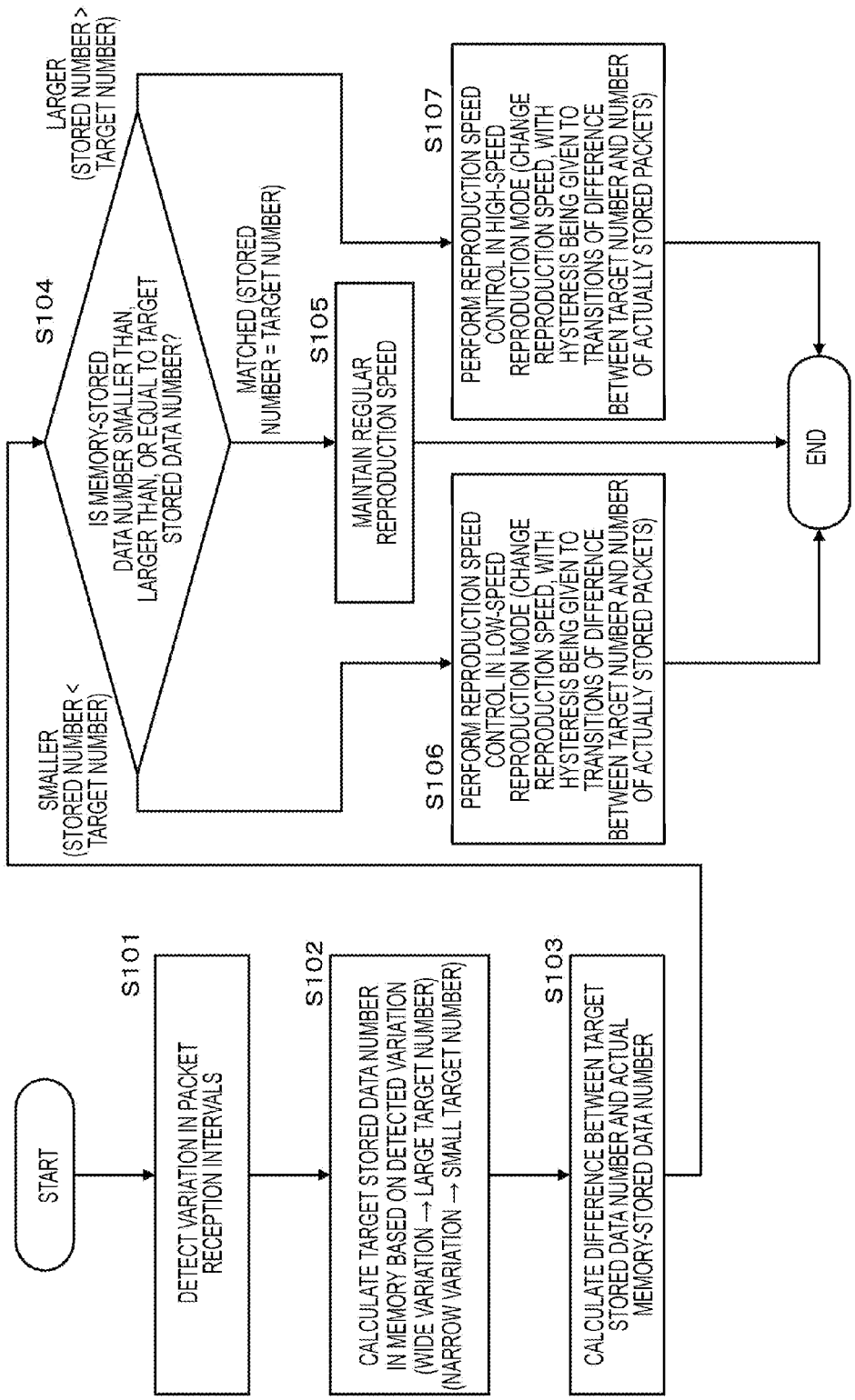
FIG. 6 is a flowchart for explaining the sequence of the audio data reproduction control process to be performed by the client.

In the following, the procedures of the respective steps in the flowchart shown in FIG. 6 are sequentially described.

(Step S101)

First, the audio data processing unit 83 detects the variation in the packet reception intervals of received audio packets.

This process is a process to be performed by the packet reception state monitoring unit 102.

The packet reception state monitoring unit 102 detects reception intervals of packets containing audio data received from the server 30.

The server 30 transmits audio packets at predetermined intervals. However, the reception intervals of audio packets received by the client 20 are not uniform due to a congestion state of the network or the like, and fluctuations or so-called jitter occurs.

The packet reception state monitoring unit 102 calculates the variation in the reception intervals of the respective packets containing audio data.

As described above, the standard deviation of reception intervals of packets containing audio data can be used as an index value of variation, for example.

When the standard deviation is calculated, the packet reception state monitoring unit 102 first calculates the variance of the input intervals of audio data packets input to the audio data processing unit 83, and calculates the standard deviation (stdDev=√(variance)) based on the calculated variance.

The index value of variation is not limited to the standard deviation, and some other value may be used. For example, the value of a longer reception interval than the mean value of packet reception intervals may be used.

(Step S102)

The audio data processing unit 83 calculates the target stored data number in the memory based on the detected variation. A large target number is set when the variation is wide, and a small target number is set when the variation is narrow.

This process is also a process to be performed by the packet reception state monitoring unit 102. The packet reception state monitoring unit 102 detects the reception intervals of packets containing audio data received by the communication unit 52. In accordance with the detected packet reception intervals, the packet reception state monitoring unit 102 calculates the target stored data number (target buffer number) 122 in the audio data storage memory 101, and outputs the target stored data number 122 to the memory-stored data number monitoring unit 103.

In a case where the standard deviation (stdDev=√(variance)) is calculated as the variation in packet reception intervals in step S101, for example, the target stored data number 122 can be calculated according to the above described mathematical formula (3).

That is, the target stored data number (target buffer number) 122 is expressed as $$\text{``target stored data number''} = 3 + \text{floor}(\text{stdDev}) \quad (3).$$

The target stored data number (target buffer number) 122 is calculated according to the above described mathematical formula (3), and is output to the memory-stored data number monitoring unit 103.

(Step S103)

In step S103, the audio data processing unit 83 calculates the difference between the target stored data number and the actual memory-stored data number. This process is a process to be performed by the memory-stored data number monitoring unit 103.

The memory-stored data number monitoring unit 103 detects the memory-stored data number (current buffer number) 121 on a regular basis (every two seconds, for example), and calculates the difference from the target stored data number (target buffer number) 122 that is input from the packet reception state monitoring unit 102.

That is, [(memory-stored data number)−(target stored data number)] is calculated on a regular basis. This calculated value corresponds to the abscissa axis of the graph shown in FIG. 5.

(Step S104)

The memory-stored data number monitoring unit 103 determines whether the memory-stored data number is smaller than the target stored data number, or is larger than the target stored data number.

Specifically, a check is made to determine whether the difference value of [(memory-stored data number)−(target stored data number)] calculated in step S103 is a positive value, is a negative value, or is 0.

If the memory-stored data number is equal to the target stored data number, the process moves on to step S105.

If the memory-stored data number is smaller than the target stored data number, the process moves on to step S106.

If the memory-stored data number is larger than the target stored data number, the process moves on to step S107.

The processes in steps S105 through S107 are processes to be performed by the reproduction control unit 104 based on the reproduction speed control information (speed control) that is output from the memory-stored data number monitoring unit 103.

(Step S105)

If the memory-stored data number is determined to be equal to the target stored data number in the determination process in step S104, the process moves on to step S105.

In step S105, reproduction speed control is performed so as to maintain the current reproduction speed.

This is a process to be performed based on the reproduction speed control information (speed control) that is output from the memory-stored data number monitoring unit 103.

In the case where [(memory-stored data number)−(target stored data number)] is 0, the memory-stored data number monitoring unit 103 generates the reproduction speed control information (speed control) so as to maintain the current reproduction speed, and outputs the reproduction speed control information (speed control) to the reproduction control unit 104.

Based on this reproduction speed control information (speed control), the reproduction control unit 104 performs reproduction speed control so as to maintain the current reproduction speed.

This process corresponds to point a in the graph shown in FIG. 5.

(Step S106)

If the memory-stored data number is determined to be smaller than the target stored data number in the determination process in step S104, the process moves on to step S106.

In step S106, reproduction control is performed in the low-speed reproduction mode. However, the reproduction speed is changed, with hysteresis being given to transitions of the difference between the target number and the number of actually stored packets.

This is a process to be performed by the reproduction control unit 104 based on the reproduction speed control information (speed control) that is output from the memory-stored data number monitoring unit 103.

This process corresponds to points h through m in the graph shown in FIG. 5.

As described above with reference to FIG. 5, the reproduction speed is changed, with hysteresis being given to transitions of the difference between the target stored data number and the memory-stored data number.

For example, in the specific example described with reference to FIG. 5, the reproduction speed is lowered when two successive decreases in [(memory-stored data number)–(target stored data number)] are detected. The reproduction speed is increased when two successive increases in [(memory-stored data number)–(target stored data number)] are detected.

However, a lower limit value of the reproduction speed is set, so that reproduction at a lower speed than the lower speed value is not performed. In the example illustrated in FIG. 5, the lower limit value of the reproduction speed is 99% of the regular reproduction speed.

(Step S107)

If the memory-stored data number is determined to be larger than the target stored data number in the determination process in step S104, the process moves on to step S107.

In step S107, reproduction control is performed in the high-speed reproduction mode. However, the reproduction speed is changed, with hysteresis being given to transitions of the difference between the target number and the number of actually stored packets.

This is a process to be performed by the reproduction control unit 104 based on the reproduction speed control information (speed control) that is output from the memory-stored data number monitoring unit 103.

This process corresponds to points b through g in the graph shown in FIG. 5.

The reproduction control in the high-speed reproduction mode is performed in a case where [(memory-stored data number)–(target stored data number)] is greater than 0.

For example, in the specific example described with reference to FIG. 5, the reproduction speed is increased when two successive increases in [(memory-stored data number)–(target stored data number)] are detected. The reproduction speed is lowered when two successive decreases in [(memory-stored data number)–(target stored data number)] are detected.

However, an upper limit value of the reproduction speed is set, so that reproduction at a higher speed than the upper speed value is not performed. In the example illustrated in FIG. 5, the upper limit value of the reproduction speed is 101% of the regular reproduction speed.

In this manner, audio reproduction speed control is performed.

In the present disclosure, the memory-stored data number is dynamically changed in accordance with packet reception intervals, and the reproduction speed changing process is performed in accordance with the difference between the target value and the number of actually stored packets.

Also, the reproduction speed changing process is performed, with hysteresis being given to transitions of the difference between the target number and the number of actually stored packets.

As such a process is performed, natural sound reproduction that will not cause viewers to have a feeling of strangeness can be realized, and the possibility of intermittent sound generation due to a shortage of packets stored in the memory can be reduced.

6. Example of an Image Data Reproduction Control Process to be Performed by the Image Data Processing Unit Next, an image reproduction control process to be performed in the client 20 is described.

Figure 7:
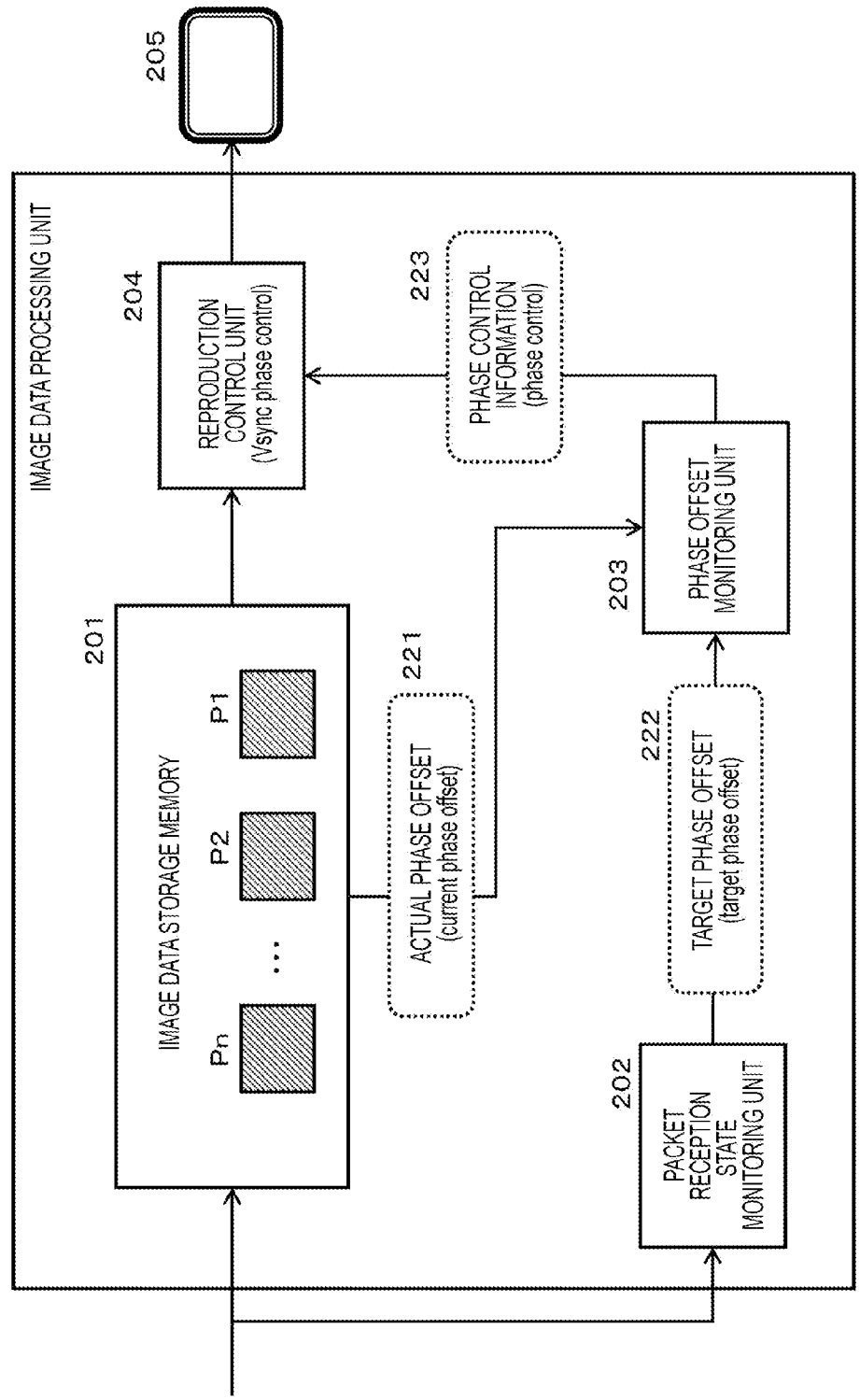
FIG. 7 is a diagram for explaining an example structure of the image data processing unit of the client.

FIG. 7 is a diagram showing an example structure of the image data processing unit 82 of the client 20.

As shown in FIG. 7, the image data processing unit 82 includes an image data storage memory 201, a packet reception state monitoring unit 202, a phase offset monitoring unit 203, and a reproduction control unit 204. The reproduction control unit 204 outputs images to the output unit 205 formed with a display such as an LCD. The reproduction control unit 204 and the output unit 205 such as a display are connected by an HDMI cable, for example.

The image data storage memory 201 is a memory that stores packets received from the server 30, and sequentially stores image packets containing image data selected by the packet dividing unit 81.

P1, P2, . . . , Pn shown in the drawing represent the image packets.

Each of those packets contains reproduction image data.

The packet reception state monitoring unit 202 detects reception intervals of packets containing image data received from the server 30.

The server 30 transmits image packets at predetermined intervals. However, the reception intervals of image packets received by the client 20 are not uniform due to a congestion state of the network or the like, and fluctuations or so-called jitter occurs.

The packet reception state monitoring unit 202 detects the reception intervals of respective packets containing image data. In accordance with the detected packet reception intervals, the packet reception state monitoring unit 202 calculates a target phase offset 222, and outputs the target phase offset 222 to the phase offset monitoring unit 203.

Figure 8:
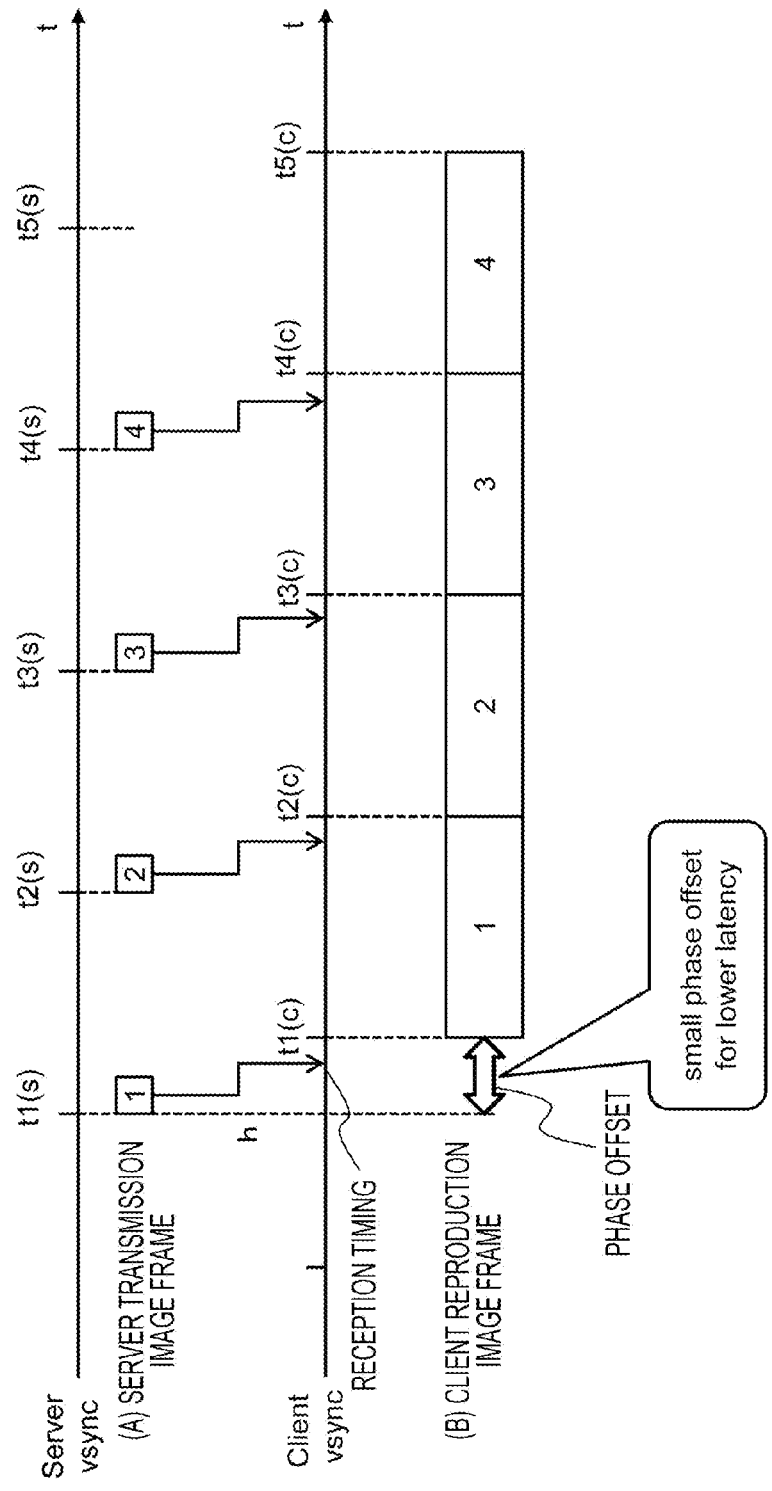
FIG. 8 is a diagram for explaining an example of an image data reproduction process to be performed by the client.

Here, a phase offset is a difference between a vertical synchronization signal (Vsync) of the server 30 and a vertical synchronization signal (Vsync) of the client 20. Referring now to FIG. 8, a phase offset is described.

FIG. 8 is a diagram showing example sequences of image data transmission and reception in a case where delays are short.

In FIG. 8, the following two chronological sequences are shown in time lines (t).

(A) Server transmission image frame (B) Client reproduction image frame

The numerical values "1", "2", "3", and "4" in (A) and (B) are image frame numbers. Specifically, "1" represents image frame 1, and "2" represents image frame 2. Each of those frames is an image frame forming a moving image (video).

In FIG. 8, (A) shows that respective image frames 1, 2, 3, 4, . . . are transmitted at respective timings (t1(s), t2(s), t3(s), t4(s), . . . ) to output a vertical synchronization signal (Vsync) in accordance with the server clock of the server 30.

The transmission image frames 1, 2, 3, and 4 are received by the client 20 via a network.

The timings to receive the image frames 1, 2, 3, 4, . . . at the client 20 are indicated by the edges of the arrows of the respective frames 1, 2, 3, 4, . . . of (A) server transmission image frame. Those are the locations of the edges of the arrows shown on the time line (t) indicating Vsync of the client 20.

Based on the vertical synchronization signal (Vsync) generated in accordance with the client clock, the client 20 outputs the image frames 1, 2, 3, and 4 received from the server 30 to the display unit.

The image frames 1, 2, 3, and 4 are then sequentially reproduced as shown in (B) client reproduction image frame.

In the case of a moving image of 60 fps, for example, any of the display intervals of the image frames 1, 2, 3, and 4 is 1/60 sec.

The respective image frames 1, 2, 3, and 4 are displayed at the timings ((t1(*c*), t2(*c*), t3(*c*), and t4(*c*)) to generate the vertical synchronization signal (Vsync) shown in the time line of Vsync of the client 20.

A phase offset is a difference between the vertical synchronization signal (Vsync) of the server 30 and the vertical synchronization signal (Vsync) of the client 20.

In the example illustrated in FIG. 8, the difference between t1(*c*) and t1(*s*) is equivalent to a phase difference offset.

The packet reception state monitoring unit 202 of the image data processing unit 82 shown in FIG. 7 detects the reception intervals of respective packets containing image data. In accordance with the detected packet reception intervals, the packet reception state monitoring unit 202 calculates the target phase offset 222, and outputs the target phase offset 222 to the phase offset monitoring unit 203.

The target phase offset 222 is made larger when the variation in the reception intervals of respective packets containing image data is wide, and is made smaller when the variation in the reception intervals of respective packets containing image data is narrow. The packet reception state monitoring unit 202 outputs the target phase offset 222, which is set in this manner, to the phase offset monitoring unit 203.

The phase offset monitoring unit 203 acquires the actual phase offset (current phase offset) 221 of the image packet currently stored in the image data storage memory 201.

This actual phase offset 221 is acquired from temporal information about the vertical synchronization signal (Server vsync) of the server 30. The temporal information is set as metadata of received image frames.

The phase offset monitoring unit 203 generates phase control information (phase control) 223 based on the two kinds of data: (a) the actual phase offset (current phase offset) 221, and (b) the target phase offset 222. The phase control information (phase control) 223 is then output to the reproduction control unit 204.

The reproduction control unit 204 sequentially acquires image packets from the image data storage memory 201, and performs processes such as decoding. The results are output to the output unit 205 such as a display.

In this image reproduction process, the reproduction control unit 204 performs an image reproduction process with an optimum phase offset that is set based on the phase control information (phase control) 223, which is input from the phase offset monitoring unit 203.

Specifically, when the variation in packet reception intervals is narrow (or the jitter is low), the phase offset is made smaller.

When the variation in packet reception intervals is wide (or the jitter is high), the phase offset is made larger.

The image reproduction process is performed by controlling the phase offset in such a manner.

The example illustrated in FIG. 8 is an example process to be performed when the variation in packet reception intervals is narrow (or the jitter is low).

As described above, when the variation in packet reception intervals is narrow (or the jitter is low), image reproduction is performed with a small phase offset. As a small phase offset is set, reproduction with shorter reproduction delays can be realized.

Figure 9:
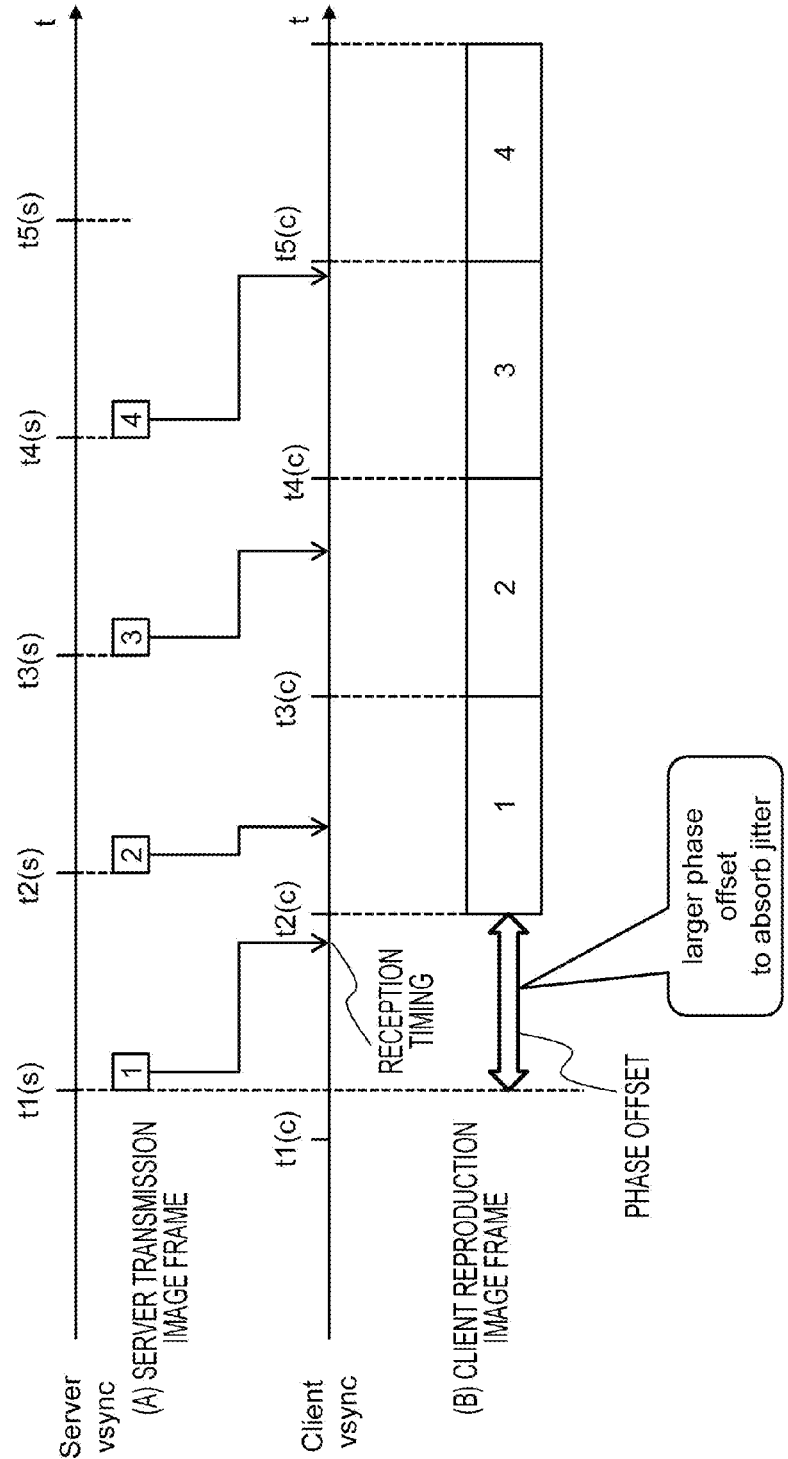
FIG. 9 is a diagram for explaining another example of an image data reproduction process to be performed by the client.

The example illustrated in FIG. 9 is an example process to be performed when the variation in packet reception intervals is wide (or the jitter is high).

When the variation in packet reception intervals is wide (or the jitter is high), image reproduction is performed with a large phase offset. As a large phase offset is set, reproduction delays become longer. However, even when there is a long delay, or when the period from transmission from the server to reception at the client is long as in the case of image frame 4, for example, image frame 4 can be output at the timing (t5(*c*)) to output the synchronization signal (Vsync) of the client without delay. As a result, smooth image reproduction without generation of a discontinuous image can be performed.

This image reproduction process is performed by taking into account both the vertical synchronization signal (Server vsync) based on the server clock of the server 30 and the vertical synchronization signal (Client vsync) based on the client clock of the client 20. Accordingly, an effect to correct a clock shift between the server 30 and the client 20 is also achieved.

7. Sequence of the Reproduction Control Process to be Performed by the Image Data Processing Unit Referring now to the flowchart shown in FIG. 10, the reproduction control sequence to be performed by the image data processing unit 82 is described.

Figure 10:
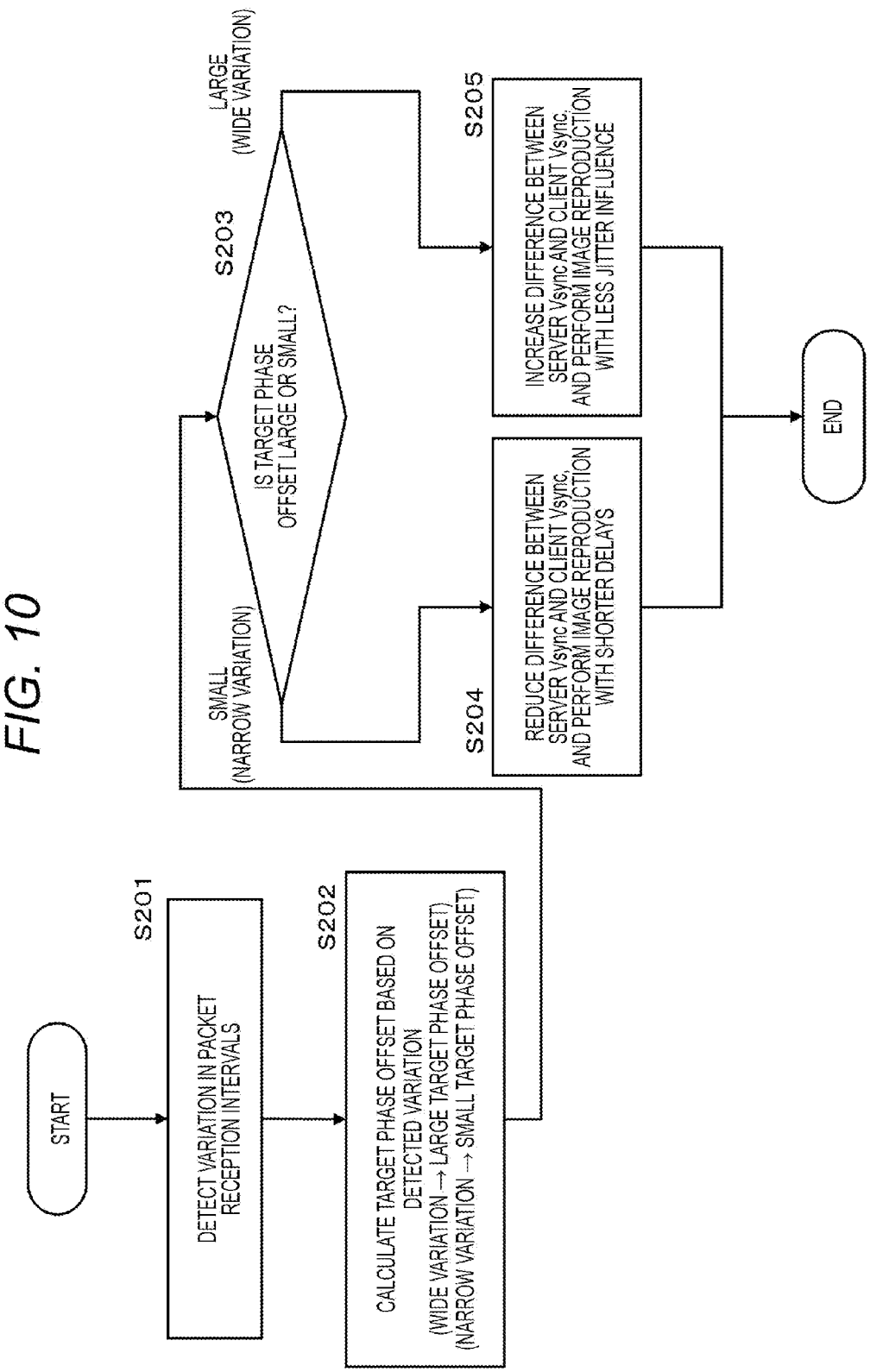
FIG. 10 is a flowchart for explaining the sequence of an image data reproduction control process to be performed by the client.

The flow shown in FIG. 10 is realized by performing a process in accordance with a program stored in the storage unit under the control of the control unit of the client 20, for example.

In the following, the procedures of the respective steps in the flowchart shown in FIG. 10 are sequentially described.
(Step S201)

First, the image data processing unit 82 detects the variation in the packet reception intervals of received image packets.

This process is a process to be performed by the packet reception state monitoring unit 202.

The packet reception state monitoring unit 202 detects reception intervals of packets containing image data received from the server 30.

The server 30 transmits image packets at predetermined intervals. However, the reception intervals of image packets received by the client 20 are not uniform due to a congestion state of the network or the like, and fluctuations or so-called jitter occurs.

The packet reception state monitoring unit 202 calculates the variation in the reception intervals of the respective packets containing image data.

The standard deviation of reception intervals of packets containing image data can be used as an index value of variation, for example.

When the standard deviation is calculated, the packet reception state monitoring unit 202 first calculates the variance of the input intervals of image data packets input to the image data processing unit 82, and calculates the standard deviation (stdDev=√(variance)) based on the calculated variance.

The index value of variation is not limited to the standard deviation, and some other value may be used. For example, the value of a longer reception interval than the mean value of packet reception intervals may be used.
(Step S202)

The image data processing unit 82 calculates a target phase offset based on the detected variation. This process is also a process to be performed by the packet reception state monitoring unit 202. The packet reception state monitoring unit 202 calculates the target phase offset 222 based on the variation in the packets containing image data received by the communication unit 52, and outputs the target phase offset 222 to the phase offset monitoring unit 203.

The target phase offset 222 is made larger when the variation in the reception intervals of respective packets containing image data is wide, and is made smaller when the variation in the reception intervals of respective packets containing image data is narrow.

The packet reception state monitoring unit 202 outputs the target phase offset 222, which is set in this manner, to the phase offset monitoring unit 203.

(Steps S203 through S205)

The processes in steps S203 through S205 are processes to be performed by the phase offset monitoring unit 203 and the reproduction control unit 204.

The phase offset monitoring unit 203 acquires the actual phase offset (current phase offset) 221 of the image packet currently stored in the image data storage memory 201.

This actual phase offset 221 is acquired from temporal information about the vertical synchronization signal (Server vsync) of the server 30. The temporal information is set as metadata of received image frames.

The phase offset monitoring unit 203 generates the phase control information (phase control) 223 based on the two kinds of data: (a) the actual phase offset (current phase offset) 221, and (b) the target phase offset 222. The phase control information (phase control) 223 is then output to the reproduction control unit 204.

The reproduction control unit 204 sequentially acquires image packets from the image data storage memory 201, and performs processes such as decoding. The results are output to the output unit 205 such as a display.

In this image reproduction process, the reproduction control unit 204 performs an image reproduction process with an optimum phase offset that is set based on the phase control information (phase control) 223, which is input from the phase offset monitoring unit 203.

Specifically, when the variation in packet reception intervals is narrow (or the jitter is low), the process moves from step S203 on to step S204, and reproduction control is performed with a smaller phase offset (a smaller difference between Vsync of the server and Vsync of the client).

This corresponds to the example process described above with reference to FIG. 8.

When the variation in the packet reception intervals is wide (or the jitter is high), on the other hand, the process moves from step S203 on to step S205, and reproduction control is performed with a larger phase offset (a larger difference between Vsync of the server and Vsync of the client).

This corresponds to the example process described above with reference to FIG. 9.

The image reproduction process is performed by controlling the phase offset in such a manner.

By performing the above described image reproduction, a small phase offset is set when the jitter is low. Accordingly, a reproduction process that causes only short reproduction delays is realized.

When the jitter is high, on the other hand, a large phase offset is set. Accordingly, even when a packet is received after a long delay, smooth reproduction without generation of a discontinuous image is realized.

8. Example Hardware Configuration of the Client

Referring now to FIG. 11, an example configuration of a communication device serving as the client is described. FIG. 11 shows an example hardware configuration of the client.

A CPU (Central Processing Unit) 401 functions as a data processing unit that performs various kinds of processes in accordance with programs stored in a ROM (Read Only Memory) 402 or a storage unit 408. For example, processes in accordance with the sequences described in the above embodiment are carried out. Programs to be executed by the CPU 401 and data are stored in a RAM (Random Access Memory) 403. The CPU 401, the ROM 402, and the RAM 403 are connected to one another by a bus 404.

The CPU 401 is connected to an input/output interface 405 via the bus 404. Further, an input unit 406 formed with various switches, a keyboard, a mouse, a microphone, and the like, and an output unit 407 formed with a display, a speaker, and the like are connected to the input/output interface 405. The CPU 401 performs various kinds of processes in accordance with instructions input through the input unit 406, and outputs results of the processes to the output unit 407, for example.

The storage unit 408 connected to the input/output interface 405 is formed with a hard disk, for example, and stores programs to be executed by the CPU 401 and various kinds of data. A communication unit 409 functions as a transmission/reception unit for data communications through communication channels such as the Internet, a local area network, and broadcast waves, and communicates with external devices.

A drive 410 connected to the input/output interface 405 drives a removable medium 411 that is a magnetic disk, an optical disk, a magnetooptical disk, or a semiconductor memory such as a memory card, and performs data recording or reading.

Data encoding and decoding can be performed as a process by the CPU 401 serving as a data processing unit. However, a codec as special-purpose hardware for performing encoding processes and decoding processes may also be included.

9. Summary of the Structures of the Present Disclosure

Embodiments of the present disclosure have been described in detail with reference to specific examples. However, it is obvious that a person skilled in the art can make modifications to the embodiments or substitutions of the embodiments without departing from the scope of the present disclosure. That is, the present disclosure has been described in the form of embodiments, and those embodiments are not to be interpreted in a restrictive manner. The claims should be taken into account in understanding the subject matter of the present disclosure.

The present technique disclosed in this specification may also be embodied in the structures described below.

(1) A communication device including:

a packet reception state monitoring unit that monitors reception intervals of packets received by a communication unit, and generates and outputs a target value as a parameter for a reproduction control process based on the variation in the packet reception intervals; and a reproduction control unit that performs reproduction control in accordance with the target value generated by the packet reception state monitoring unit, wherein the reproduction control unit controls an audio reproduction speed or image frame reproduction in accordance with the target value.

(2) The communication device of (1), wherein the packet reception state monitoring unit calculates a target stored data number as a target number of audio packets stored in a memory based on the variation in the reception intervals of audio packets received by the communication unit, and the reproduction control unit controls the audio reproduction speed in accordance with the difference between the target stored data number and a memory-stored data number that is the number of audio packets actually stored in the memory.

(3) The communication device of (2), wherein the packet reception state monitoring unit makes the target stored data number larger when the variation in the reception intervals of the audio packets received by the communication unit is wide, and makes the target stored data number smaller when the variation is narrow.

(4) The communication device of (2) or (3), wherein the reproduction control unit performs reproduction control in a low-speed reproduction mode at a lower speed than a regular reproduction speed when the memory-stored data number is smaller than the target stored data number, and performs reproduction control in a high-speed reproduction mode at a higher speed than the regular reproduction speed when the memory-stored data number is larger than the target stored data number.

(5) The communication device of any of (2) through (4), wherein the reproduction control unit changes the audio reproduction speed by giving hysteresis to a transition of the difference between the memory-stored data number and the target stored data number.

(6) The communication device of any of (2) through (5), wherein the reproduction control unit performs an audio reproduction speed control process to increase the audio reproduction speed when the difference value between the memory-stored data number and the target stored data number continuously increases, and reduce the audio reproduction speed when the difference value between the memory-stored data number and the target stored data number continuously decreases.

(7) The communication device of any of (2) through (6), wherein the packet reception state monitoring unit calculates the standard deviation of the reception intervals of audio packets received by the communication unit, to calculate the variation in the reception intervals of the audio packets.

(8) The communication device of (7), wherein the packet reception state monitoring unit makes the target stored data number larger when the standard deviation in the reception intervals of the audio packets is large, and makes the target stored data number smaller when the standard deviation in the reception intervals is small.

(9) The communication device of any of (2) through (8), wherein the memory-stored data number is the average value of the numbers of packets stored in the memory in a predetermined period of time.

(10) The communication device of (1), wherein the packet reception state monitoring unit calculates a target phase offset as a target value of a phase offset equivalent to the difference between a server vertical synchronization signal of a server transmitting packets and a client vertical synchronization signal of a client that is the communication device based on the variation in the reception intervals of image packets received by the communication unit, and the reproduction control unit performs image reproduction control by determining the timing to reproduce an image frame in accordance with the target phase offset.

(11) The communication device of (10), wherein the packet reception state monitoring unit makes the target phase offset larger when the variation in the reception intervals of the image packets received by the communication unit is wide, and makes the target phase offset smaller when the variation is narrow.

(12) The communication device of (10) or (11), wherein, when the variation in the reception intervals of the image packets is narrow, and the target phase offset is small, the reproduction control unit sets a small phase offset and performs image reproduction with shorter reproduction delays.

(13) The communication device of any of (10) through (12), wherein, when the variation in the reception intervals of the image packets is wide, and the target phase offset is large, the reproduction control unit sets a large phase offset and performs image reproduction with a reduced possibility of intermittent reproduction due to a packet delay.

(14) A data processing method implemented in a communication device, including:

a packet reception state monitoring unit monitoring reception intervals of packets received by a communication unit, and generating and outputting a target value as a parameter for a reproduction control process based on the variation in the packet reception intervals; and a reproduction control unit performing reproduction control in accordance with the target value generated by the packet reception state monitoring unit, wherein an audio reproduction speed or image frame reproduction is controlled in accordance with the target value in the reproduction control.

The series of processes described in this specification can be performed by hardware, software, or a combination of hardware and software. In a case where the processes are performed by software, a program in which the processing sequences are recorded is installed in a memory incorporated into special-purpose hardware in a computer, or the program is installed in a general-purpose computer that can perform various kinds of processes. Programs can be recorded beforehand in a recording medium, for example. Programs can be installed from the recording medium into a computer. Alternatively, programs may be received via a network such as the Internet, and be installed into a recording medium such as an internal hard disk.

The various processes described in this specification are carried out not only in chronological order in accordance with the disclosure, but also in parallel or independently of one another depending on the processing capacity of the device carrying out the processes or depending on the degree of necessity. In this specification, a "system" means a logical assembly of devices, and the respective devices are not necessarily located in the same housing.

INDUSTRIAL APPLICABILITY

As described above, an embodiment of the present disclosure realizes a device and a method for monitoring the variation in packet reception intervals and performing optimum reproduction control in accordance with the variation.

Specifically, a packet reception state monitoring unit calculates a target stored data number as a target number of audio packets stored in a memory based on the variation in the reception intervals of audio packets, and a reproduction control unit controls the audio reproduction speed in accordance with the difference between the target stored data number and a memory-stored data number. When the memory-stored data number is smaller than the target stored data number, reproduction control is performed in a low-speed reproduction mode at a lower speed than a regular reproduction speed. When the memory-stored data number is larger than the target stored data number, reproduction control is performed in a high-speed reproduction mode at a higher speed than the regular reproduction speed. A reproduction speed changing process is performed, with hysteresis being given to transitions of the difference between the memory-stored data number and the target stored data number.

With this structure, a device and a method for monitoring the variation in packet reception intervals and performing optimum reproduction control in accordance with the variation is realized.

REFERENCE SIGNS LIST

10 Communication system
20 Client
21 TV
22 PC
23 Portable terminal
30 Server
51 Data processing unit
52 COMMUNICATION UNIT
53 STORAGE UNIT
54 INPUT UNIT
55 OUTPUT UNIT
71 Data processing unit
72 COMMUNICATION UNIT
73 STORAGE UNIT
81 Packet dividing unit
82 IMAGE DATA PROCESSING UNIT
83 Audio data processing unit
84 Control unit
101 Audio data storage memory
102 Packet reception state monitoring unit
103 Memory-stored data number monitoring unit
104 Reproduction control unit
105 OUTPUT UNIT
201 Image data storage memory
202 Packet reception state monitoring unit
203 Phase offset monitoring unit
204 Reproduction control unit
305 OUTPUT UNIT
401 CPU
402 ROM
403 RAM
404 Bus
405 INPUT/OUTPUT INTERFACE
406 INPUT UNIT
407 OUTPUT UNIT
408 STORAGE UNIT
409 COMMUNICATION UNIT
410 DRIVE
411 REMOVABLE MEDIUM

The invention claimed is:

1. A communication device comprising:
a processor and a memory including instructions which, when executed by the processor, control:
monitoring reception intervals of packets received by a communication unit, and generating and outputting a target value as a parameter for a reproduction control process based on a variation in the packet reception intervals; and
performing reproduction control in accordance with the target value,
wherein the reproduction control is to control an audio reproduction speed or image frame reproduction, in which the audio reproduction speed is controlled in accordance with the target value, in which the target value is generated by calculating a target stored data number as a target number of audio packets to be stored in a memory based on the variation in the reception intervals of audio packets received by the communication unit, and in which the audio reproduction speed is controlled in accordance with a determination whether a difference between the target stored data number and a memory-stored data number that is the number of audio packets actually stored in the memory changes successively in a same direction.

2. The communication device according to claim 1, wherein the instructions, when executed by the processor, control making the target stored data number larger when the variation in the reception intervals of the audio packets received by the communication unit is wide, and the target stored data number smaller when the variation is narrow.

3. The communication device according to claim 1, wherein the instructions, when executed by the processor, control performing
the reproduction control in a low-speed reproduction mode at a lower speed than a regular reproduction speed when the memory-stored data number is smaller than the target stored data number, and
the reproduction control in a high-speed reproduction mode at a higher speed than the regular reproduction speed when the memory-stored data number is larger than the target stored data number.

4. The communication device according to claim 3, wherein the instructions, when executed by the processor, control changing the audio reproduction speed by giving hysteresis to a transition of the difference between the memory-stored data number and the target stored data number.

5. The communication device according to claim 3, wherein the instructions, when executed by the processor, control performing an audio reproduction speed control process to
increase the audio reproduction speed when a difference value between the memory-stored data number and the target stored data number continuously increases, and
reduce the audio reproduction speed when the difference value between the memory-stored data number and the target stored data number continuously decreases.

6. The communication device according to claim 1, wherein the instructions, when executed by the processor, control calculating a standard deviation of the reception intervals of audio packets received by the communication unit, to calculate the variation in the reception intervals of the audio packets.

7. The communication device according to claim 6, wherein the instructions, when executed by the processor, control making the target stored data number larger when the standard deviation in the reception intervals of the audio packets is large, and the target stored data number smaller when the standard deviation in the reception intervals is small.

8. The communication device according to claim 1, wherein the memory-stored data number is an average value of the numbers of packets stored in the memory in a predetermined period of time.

9. The communication device according to claim 1, wherein the instructions, when executed by the processor, control:
calculating a target phase offset as a target value of a phase offset equivalent to a difference between a server vertical synchronization signal of a server transmitting packets and a client vertical synchronization signal of a client based on the variation in the reception intervals of image packets received by the communication unit, the client being the communication device, and performing image reproduction control by determining the timing to reproduce an image frame in accordance with the target phase offset.

10. The communication device according to claim 9, wherein the instructions, when executed by the processor, control making the target phase offset larger when the variation in the reception intervals of the image packets received by the communication unit is wide, and the target phase offset smaller when the variation is narrow.

11. The communication device according to claim 10, wherein the instructions, when executed by the processor, when the variation in the reception intervals of the image packets is narrow, and the target phase offset is small, control setting a small phase offset and performing image reproduction with a shorter reproduction delay.

12. The communication device according to claim 10, wherein the instructions, when executed by the processor, when the variation in the reception intervals of the image packets is wide, and the target phase offset is large, control setting a large phase offset and performing image reproduction with a reduced possibility of intermittent reproduction due to a packet delay.

13. A data processing method implemented in a communication device, the method comprising:

monitoring reception intervals of packets received by a communication unit, and generating and outputting a target value as a parameter for a reproduction control process based on a variation in the packet reception intervals, the monitoring and the generating and outputting the target value being performed by a packet reception state monitoring unit; and performing reproduction control in accordance with the target value generated by the packet reception state monitoring unit, the reproduction control being performed by a reproduction control unit, wherein an audio reproduction speed or image frame reproduction is controlled in the reproduction control, in which the audio reproduction speed is controlled in accordance with the target value, in which the target value is generated by calculating a target stored data number as a target number of audio packets to be stored in a memory based on the variation in the reception intervals of audio packets received by the communication unit, and in which the audio reproduction speed is controlled in accordance with a determination whether a difference between the target stored data number and a memory-stored data number that is the number of audio packets actually stored in the memory changes successively in a same direction.

\* \* \* \* \*